Dec. 24, 1940.   R. J. BEATTY   2,225,948
METHOD AND APPARATUS FOR PRODUCING GLASSWARE
Filed Jan. 28, 1938   11 Sheets-Sheet 1

INVENTOR.
Robert J. Beatty.
BY
Corbett & Mahoney
ATTORNEYS.

Dec. 24, 1940.  R. J. BEATTY  2,225,948
METHOD AND APPARATUS FOR PRODUCING GLASSWARE
Filed Jan. 28, 1938  11 Sheets-Sheet 5

INVENTOR.
Robert J. Beatty.
BY
ATTORNEYS.

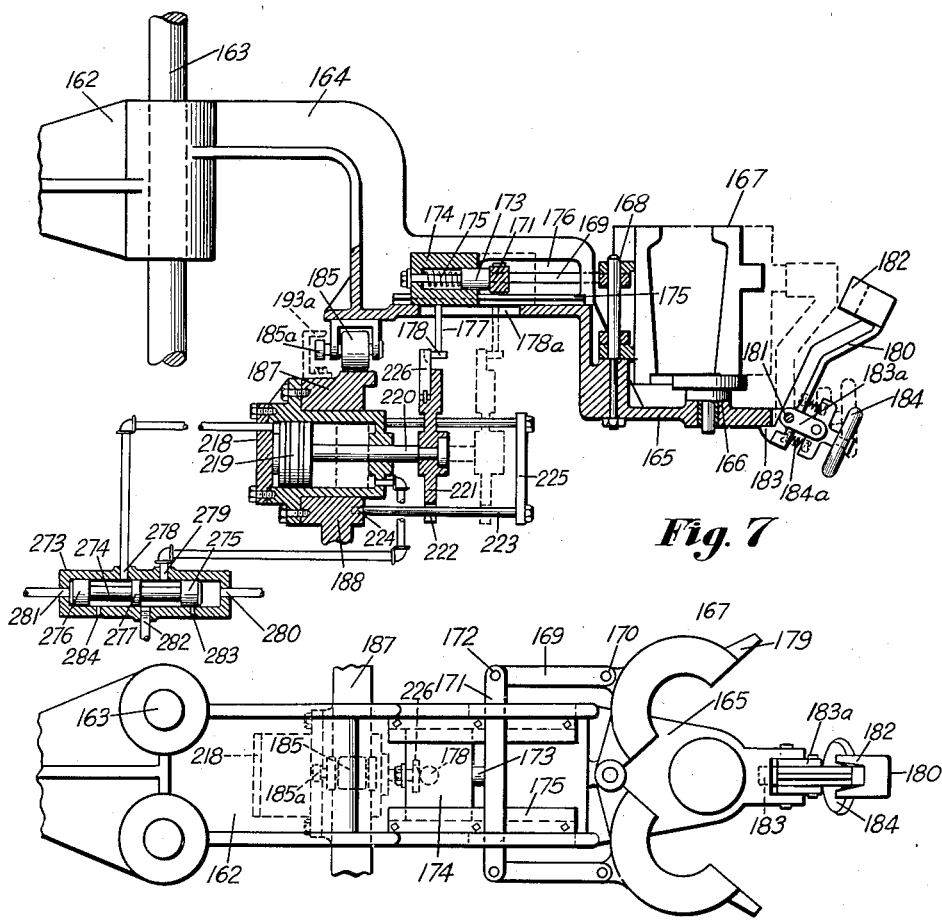
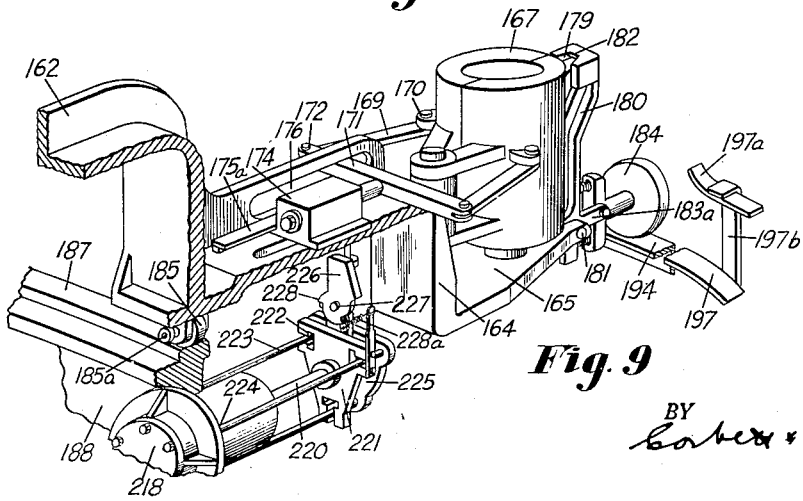
Fig. 7
Fig. 8
Fig. 9
INVENTOR.
Robert J. Beatty.
BY
ATTORNEYS.

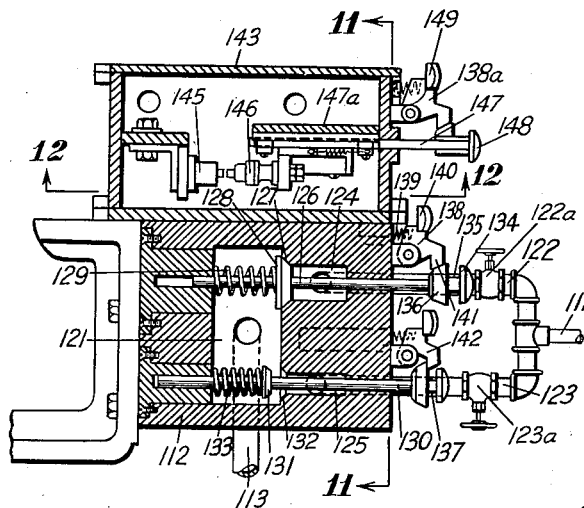

Dec. 24, 1940.  R. J. BEATTY  2,225,948
METHOD AND APPARATUS FOR PRODUCING GLASSWARE
Filed Jan. 28, 1938  11 Sheets-Sheet 8

INVENTOR.
Robert J. Beatty.
BY
Coates & Mahoney
ATTORNEYS.

Dec. 24, 1940.  R. J. BEATTY  2,225,948

METHOD AND APPARATUS FOR PRODUCING GLASSWARE

Filed Jan. 28, 1938   11 Sheets-Sheet 9

INVENTOR.
Robert J. Beatty.

BY Corbett + Mahoney
ATTORNEYS.

Dec. 24, 1940. R. J. BEATTY 2,225,948
METHOD AND APPARATUS FOR PRODUCING GLASSWARE
Filed Jan. 28, 1938 11 Sheets-Sheet 10

INVENTOR.
Robert J. Beatty.
BY Corbett + Mahoney
ATTORNEYS.

Dec. 24, 1940.  R. J. BEATTY  2,225,948
METHOD AND APPARATUS FOR PRODUCING GLASSWARE
Filed Jan. 28, 1938  11 Sheets-Sheet 11

INVENTOR.
Robert J. Beatty.
BY
Corbett & Mahoney
ATTORNEYS.

Patented Dec. 24, 1940

2,225,948

UNITED STATES PATENT OFFICE 2,225,948

METHOD AND APPARATUS FOR PRODUCING GLASSWARE

Robert J. Beatty, Columbus, Ohio, assignor to The Federal Glass Company, Columbus, Ohio, a corporation of Ohio Application January 28, 1938, Serial No. 187,465

50 Claims. (Cl. 49—5)

My invention relates to method and apparatus for producing glassware. It has to do, more particularly, with a method and apparatus for producing glassware by the paste mold process, although a number of features of my invention are not necessarily limited to a paste mold machine or a paste mold process.

Paste mold ware is commonly produced in the glass industry at the present time by hand methods. The cost of labor used in producing such ware by the hand methods is considerable and increases the cost of such ware. Furthermore, ware produced by hand methods is not of uniform quality. In the last few years there have been a number of attempts made to devise a satisfactory machine for producing paste mold ware. However, these machines have not gone into general use due to the fact that they are usually of a very complicated nature, being expensive to purchase and expensive to operate. Furthermore, they have not operated entirely satisfactorily.

One of the objects of my invention is to provide a process and machine for producing paste mold ware which is of such a nature that the ware can be produced much more economically than by the hand method.

Another object of my invention is to provide a paste mold machine and process which will produce ware that is uniform in quality and is as good or better in quality than paste mold ware now commonly produced by hand processes.

Another object of my invention is to provide a machine of the type indicated which is very efficient and economical to operate and which is comparatively simple.

Another object of my invention is to provide a paste mold machine and process wherein the various operations of the hand process are simulated but are all performed mechanically and automatically.

In its preferred form my invention contemplates the provision of a machine consisting mainly of two units, viz., a blank-forming unit and a shaping and finishing unit. The blank-forming unit comprises a blank mold table which is intermittently rotatable and which is provided with a series of one-piece blank molds thereon. Glass-feeding means is associated with the blank mold table and is synchronized with movement thereof so that suitable charges of glass are successively supplied to the blank molds. A pressing plunger is associated with the blank mold table and cooperates with the successive blank molds to press the charges therein in order to form the glass blanks. Means is associated with each blank mold for forcing the blank partly out of the mold, at the proper time, in order to expose a portion of the blank that may be gripped by a suitable member which is provided on the shaping and finishing unit.

The shaping and finishing unit comprises a rotatable turret which has means associated therewith for intermittently rotating it. This means is synchronized with the means for rotating the blank mold table. The turret carries a plurality of combination gripping tongs and blow heads. These combination tongs and blow heads are brought successively over the successive blank molds on the blank table by the synchronized movements of the blank mold table and the turret. At the time each tong is brought over the cooperating blank mold, the means associated with the blank mold for raising the blank slightly therefrom operates to expose a portion of the upper end of the blank. The blank mold is provided with means for forming a peripheral flange or lip on the upper end of the blank to facilitate removal thereof by means of the tongs. The tongs are automatically closed about the exposed portion of the blank and the blow head of the tongs seals the upper end of the blank. Then, they operate to lift the blank entirely from the blank mold and as the turret and the blank mold table continue to rotate, the blank is moved away from the mold in which it was formed.

Continued rotation of the turret causes the blank which is suspended by means of the tongs to be conducted into a heating chamber or trough. This heating chamber or trough serves to reheat the blank and to remelt the chilled skin produced on the outer surface of the blank during the pressing operation. Means is associated with the combined tongs and blow head to rotate it so that the blank will be rotated during its passage through the heating chamber. Also, means is associated with the combined tongs and blow head for supplying air pressure to the interior of the blank. During its passage through the heating chamber, only a "puff" of air is supplied to the interior of the blank. This heating and puff of air causes the blank to be elongated so that a parison is formed therefrom.

Continued rotation of the turret causes the parison to emerge from the heating chamber. As it leaves the heating chamber and is suspended from the tongs, a split blow mold which is open rises to meet the parison. A plurality of the blow molds are also carried by the turret and before rising to meet the parisons they pass through a water tank which cools the molds and wets the interiors thereof. Suitable means is provided adjacent the point where the blow mold rises to meet the parison for closing the blow mold around the parison after they have been brought into cooperative relationship with each other. When the blow mold has been closed, air under pressure is supplied through the combined tongs and blow head to the interior of the parison in order to blow it into final form in the blow mold. During this blowing operation the combined tongs and blow head is rotated in order that the article will be rotated in the paste mold so as to impart a proper polish thereto.

Continued rotation of the turret brings the blow mold to a point where means is provided for opening the blow mold and leaving the finally shaped article suspended from the tongs. At this point the blow mold again begins to move downwardly into the water trough. At a point farther along, an intermittently movable take-off conveyor is provided for removing the ware from the machine. Adjacent the conveyor means is provided for lowering the tongs until the article is supported on the conveyor and for then releasing the article. Prior to the time the blow mold is opened, rotation of the combined tongs and blow head is stopped and the supply of air through the blow head to the article is interrupted. The take-off conveyor is movable intermittently and its movement is synchronized with movement of the shaping and finishing unit. This cycle of operations will be repeated.

Various other objects and advantages will be apparent from the following description.

The preferred embodiment of my invention is illustrated in the accompanying drawings wherein similar characters of reference designate corresponding parts and wherein:

Figure 7 is a view partly in side elevation and partly in section of a blow mold and actuating means provided therefor.

Figure 8 is a plan view of the structure illustrated in Figure 7 showing the blow mold open.

Figure 9 is a view mainly in perspective of the structure illustrated in Figures 7 and 8 but showing the blow mold closed.

Figure 10 is a detail mainly in section illustrating means which I provide for controlling rotation of the combined tongs and blow heads and for controlling the supply of air pressure thereto.

Figure 11 is a vertical section taken substantially along line 11—11 of Figure 10.

Figure 12 is a horizontal section taken substantially along line 12—12 of Figure 10.

Figure 13 is a detail in section illustrating movable contacts carried by the rotating turret and stationary contacts carried by the column upon which the turret rotates for supplying current to motors carried by the turret which rotate the combined tongs and blow heads.

Figure 14 is a horizontal section taken substantially along line 14—14 of Figure 13.

Figure 2:
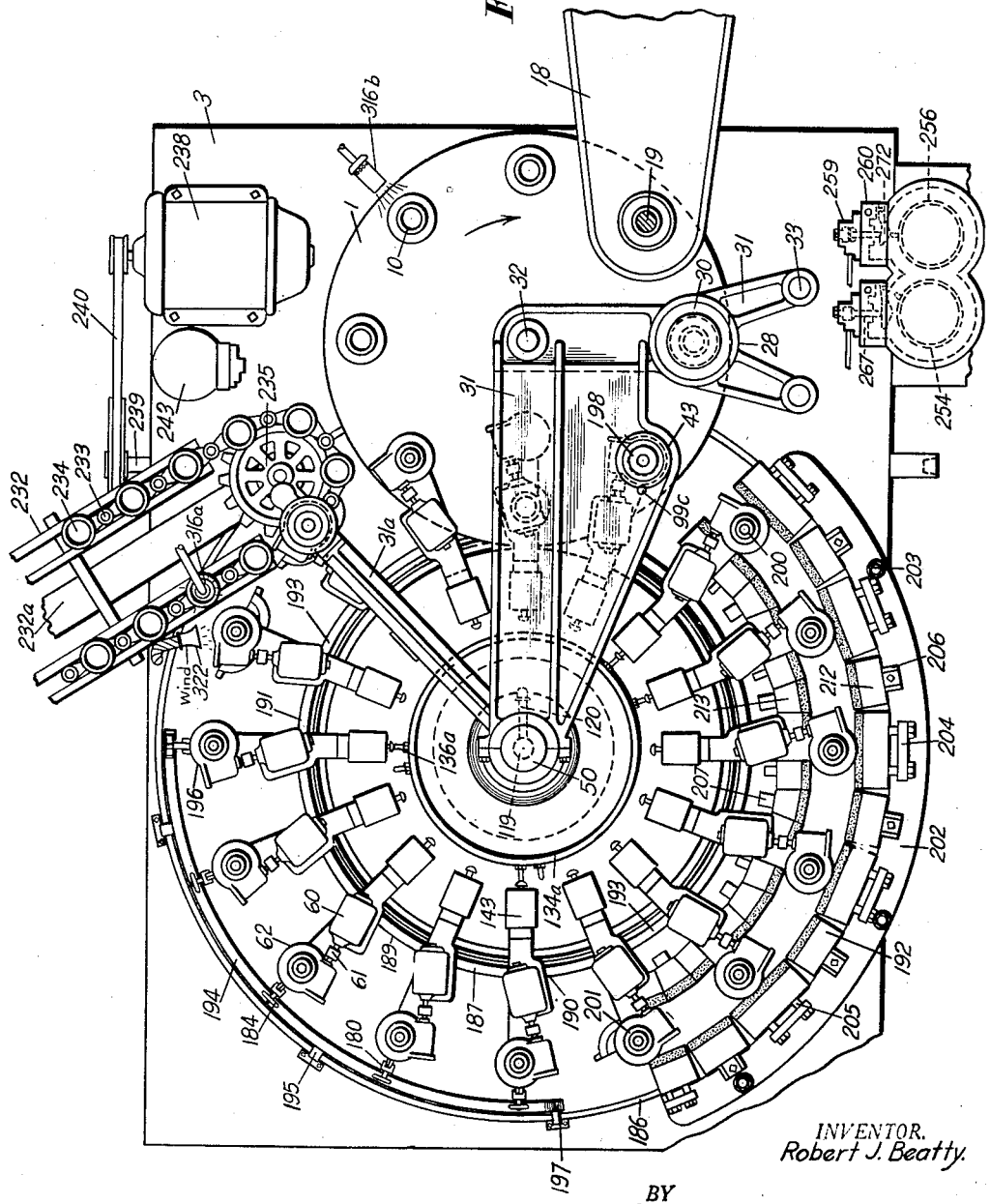
Figure 2 is a plan view of the entire machine.

With reference to the drawings, I have illustrated my machine as comprising mainly a blank-forming unit 1 and a cooperating article-shaping and finishing unit 2. Both of these units are intermittently rotatable about axes spaced from each other but in alignment as indicated in Figure 2. Furthermore, the two units are of such relative size and so arranged that during a portion of their movement they overlap each other as indicated in this figure. Both of these units are carried by a hollow base 3 which is mounted for movement on wheels 4.

The blank-forming unit

The blank-forming unit comprises a blank mold table 5 which is carried on the upper end of a rotatable column 6. This column 6 projects upwardly from the base 3. Its lower end is mounted on a rotatable member 7 resting on an anti-friction bearing 8 provided on the base. This member 7 is the driven wheel of a Geneva drive which is provided for intermittently rotating this mold table 5. The driven wheel 7 is attached to the lower end of the column 6 and supports it. A rotatable driving member 9 (Figure 5) is carried by the base and is disposed in cooperative relationship with the member 7 for driving the member 7 intermittently.

The mold table 5 carries a plurality of blank molds 10 adjacent its periphery and disposed in circumferentially spaced relationship. Eight of these blank molds are shown but it is to be understood that any suitable number may be provided. These blank molds are of the one-piece type. The structure of each of these molds is illustrated best in Figure 21. A shoulder 10a is provided in the upper end of the mold in order to produce a peripheral flange on the blank to be formed therein. Each of the molds has a blank-raising plunger 11' extending upwardly through the bottom thereof. A second plunger 11 is carried by the mold table below each plunger 11'. This plunger is adapted to be engaged by suitable means at the proper time to raise the blank partly from the mold.

Figure 1:
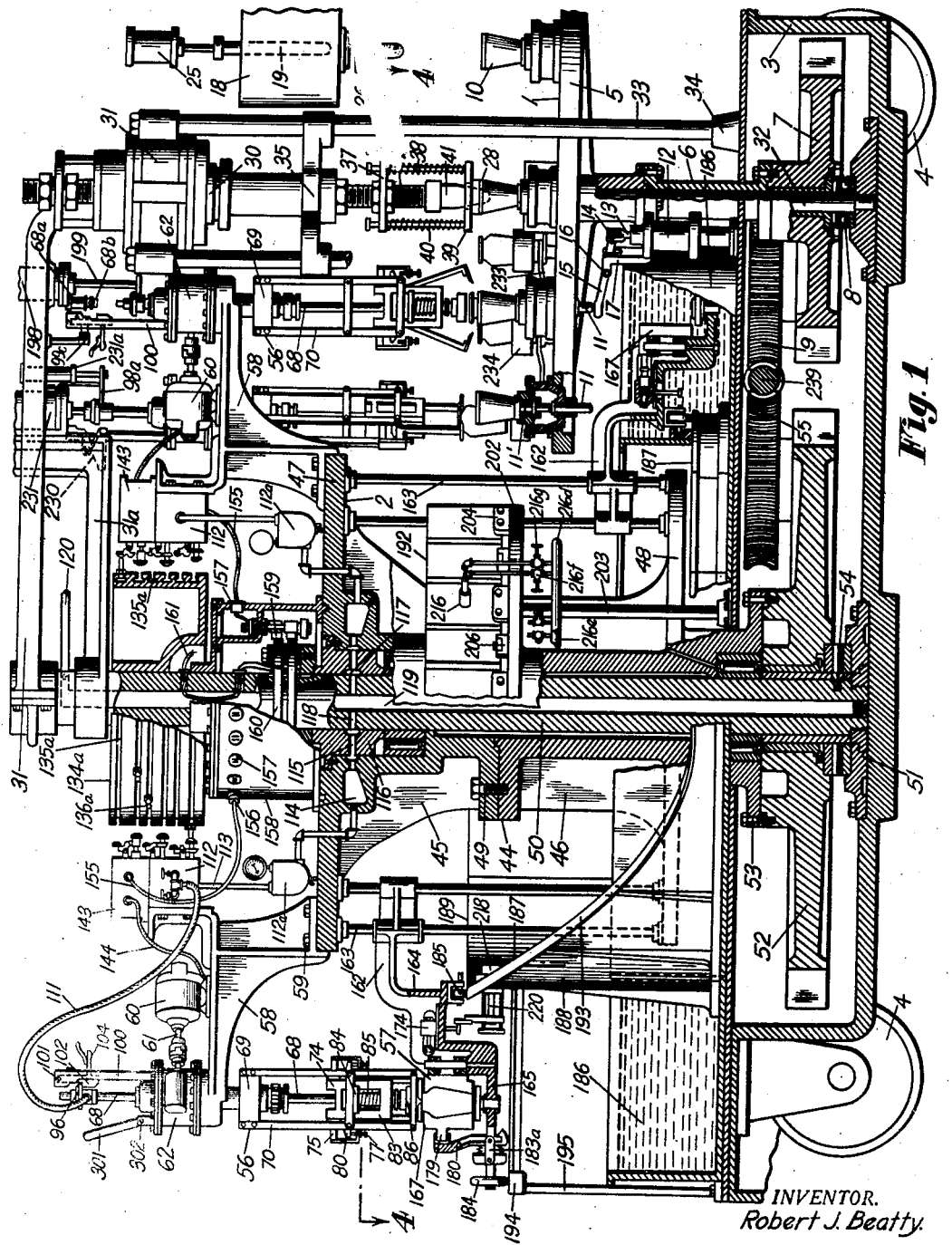
Figure 1 is a view of a machine made in accordance with my invention mainly in vertical section but partly in side elevation.

The means for moving the plunger upwardly is illustrated best in Figure 1. It comprises a cylinder and piston unit 12 which is mounted below the mold table 5 at a suitable point and is supported on the upper surface of the base 3. The piston rod 13 thereof projects upwardly and is pivotally connected at 14 to one end of a lever 14. This lever 15 is pivoted intermediate its ends at 16 to a vertical support 17 which is secured to the cylinder. The opposite end of the lever 15 projects to such a point that it will successively be engaged by the various plungers 11 provided in the bottom of the blank mold. When the plunger 11 engages the outer end of lever 15, the cylinder and piston unit 12 may be actuated to cause the piston rod 13 to move downwardly. This will swing the outer end of the lever 15 upwardly forcing the plunger 11 upwardly to a slight extent. This will cause raising of the blank in the mold in the manner illustrated in Figure 25.

Means is associated with the blank mold table 5 for feeding charges or gobs of glass to the successive blank molds. This means is synchronized with the intermittent movement of the table 5. It comprises a glass-feeding spout 18 provided with a discharge orifice in the lower wall thereof. This spout projects over the mold table. A plunger 19 is provided in the spout above the discharge orifice for controlling the feed of glass through the orifice. The plunger 19 is moved up and down at the proper intervals to control the flow of glass in the spout by means of a cylinder and piston unit 25. Shears 26 are located below the discharge orifice of the spout and are adapted to separate the stream of glass issuing through the spout orifice into gobs. The shears operate intermittently and are controlled by a cylinder and piston unit 27 (Figure 5) which is supported beneath the spout. Operation of the cylinder and piston units 25 and 27 is synchronized with movement of the mold table 5 so that the proper mold charges will be supplied successively to the blank mold 10.

The blank mold table 5 rotates intermittently in the direction indicated by the arrow in Figure 2. The molds move first to the charging station below the glass-feeding spout. After each mold is charged, the next movement of the mold table brings the mold to a pressing station indicated generally by the numeral 28. At this station I provide a pressing plunger which embodies a vertically reciprocating body portion 29 (Figures 1 and 3) having its upper end connected to a piston operating in a cylinder 30. The upper end of cylinder 30 is carried by one end of a supporting arm 31 which is carried by a post 32 extending upwardly from the column 6 of the mold table 5, but being non-rotatably connected thereto, and by a pair of vertically disposed posts 33 which have their lower ends supported on the base 3 of the machine as at 34. The lower end of the piston in cylinder 30 is provided with an extension that passes downwardly through the lower end of the cylinder and which is rigidly connected to member 35 which is free to move vertically on guide posts 33. The member 35 serves to keep the member 29 centered with relation to the blank mold. The lower portion of the member 29 is threaded and carries a collar member 37 which is threaded thereon. This member has a plurality of guide rods 38 slidably mounted in openings provided therein. These members 38 carry a ring 39 on their lower ends. Springs 40 surrounding members 38 normally keep the rods and the ring 39 in the lowermost position indicated in Figure 3. A pressing portion 41 is removably secured to the lower end of body portion 29 of the pressing plunger and is adapted to pass downwardly through the central opening in ring 39. The collar member 37 is adjustable to vary the pressure produced by springs 40 on the ring 39 during the pressing operation.

The means for moving the piston in the cylinder 30 is synchronized with movement of the mold table 5. As soon as a blank mold reaches the pressing station, the piston in the cylinder 30 moves downwardly forcing member 29 and pressing portion 41 downwardly. The ring 39 will seat on the upper end of the mold and partly close it. The forming portion 41 will continue to move and pass downwardly through ring 39 into the mold. The ring 39 will be maintained on the mold by means of springs 40, since the pressure exerted by these springs will increase as the pressing portion 41 continues to move into the mold, due to the fact that collar 37 will move downwardly on rods 38.

After the blank is formed in the blank mold, the mold table will again rotate moving such blank mold to what may be termed the lift-out station indicated by the numeral 43 in Figure 2 where the blank will be lifted from the mold in a manner to be later described. At this station, the mechanism previously described for moving the plunger 11' of the blank mold upwardly is also located.

Thus, it will be apparent that with this blank-forming unit the blank table moves intermittently between the various stations. First, a blank mold is moved to the charging station where it is supplied with a charge of glass. The next movement brings it to a pressing station where the glass is pressed into blank form. The next move brings it to a lift-out station where it is removed from the blank mold. Continued movement of the mold table will again bring the mold to the charging station.

Shaping and finishing unit

The shaping and finishing unit comprises a vertically disposed intermittently rotatable turret 44. This turret comprises an upper casting 45 and a lower casting 46. The upper casting 45 has a table-like horizontally disposed portion 47 formed on its upper end. The lower casting 46 has a similar portion 48 formed on its lower end. At their adjacent ends the two castings are provided with abutting flanges which are bolted together as at 49. The two castings are rotatably mounted on a central column 50. This column has its lower end carried by the base of the machine, as indicated at 51.

Figure 5:
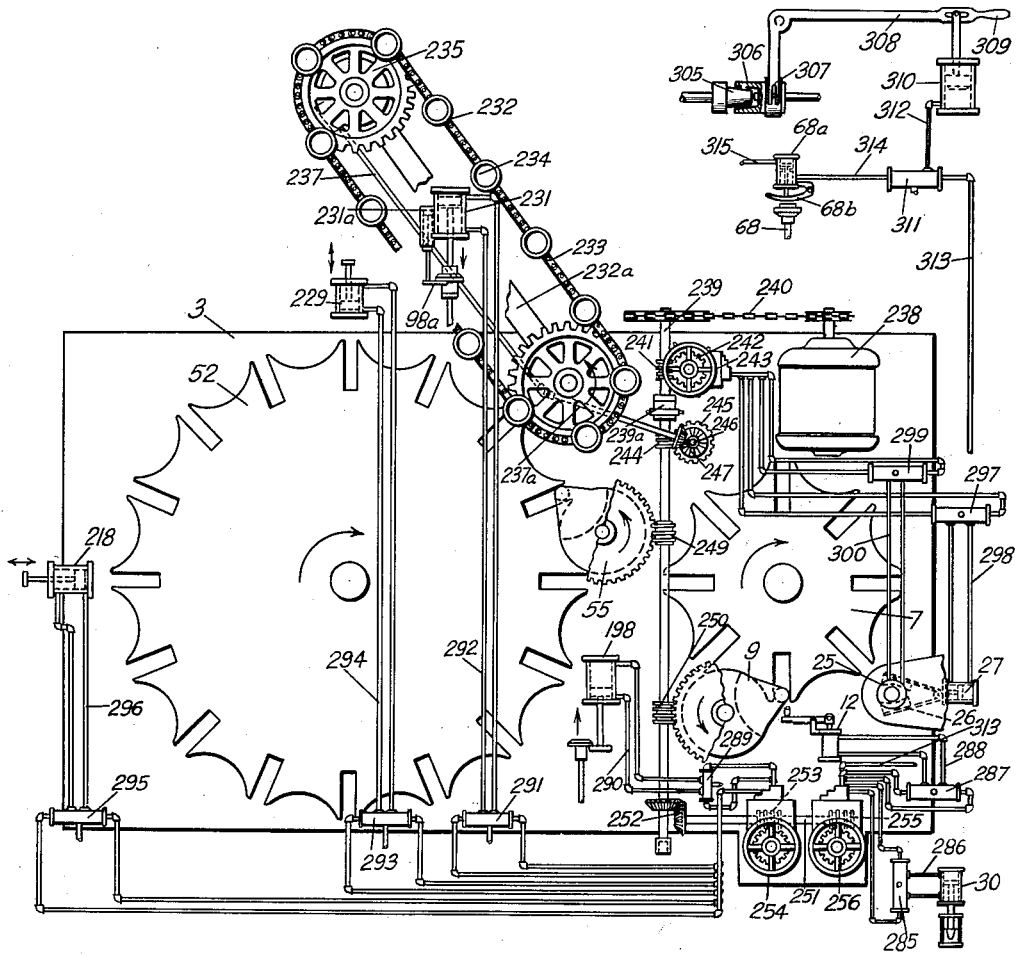
Figure 5 is a more or less diagrammatic view of the driving mechanism and certain fluid-actuating means provided on my machine.

The lower casting 46 projects into the hollow base and is carried by the driven wheel 52 of a Geneva drive to which it is bolted as indicated at 53. This wheel 52 rests on anti-friction bearings 54. As indicated in Figure 5, the Geneva wheel 52 is moved intermittently by a driving member 55. Thus, the entire turret 44 will be rotated intermittently about the stationary column 50. The column 50 extends upwardly entirely through the turret and is tied to the post 32 of the blank-forming unit by means of the arm 31. Thus, the two units are rigidly tied together. The axis of the turret is in alignment with the axis of the blank mold table.

As will be explained in detail hereinafter, the upper portion of the turret carries a series of circumferentially spaced combined tongs and blowhead units which I will indicate generally by the numeral 56. The lower portion of the turret carries a series of circumferentially spaced blowmold units which I will indicate generally by the numeral 57. In the drawings I show 16 of each of these units but it is to be understood that any number may be provided. All of the units 56 are in exact vertical alignment with the corresponding units 57.

Figure 15:
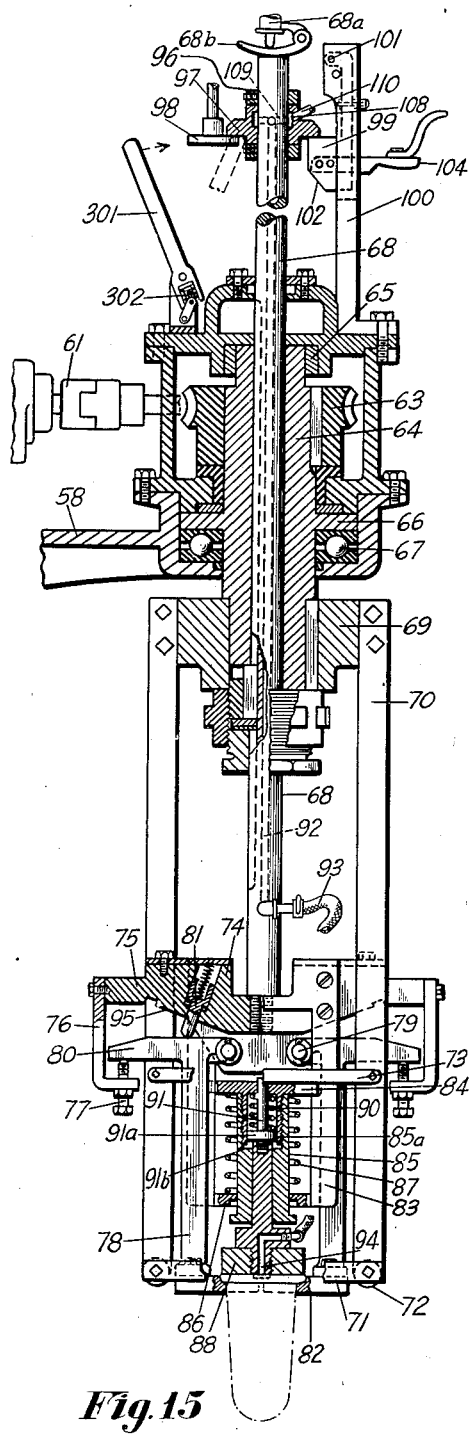
Figure 15 is a view mainly in vertical section showing the combined blow head and tongs, the tongs being shown closed about a blank.
Figure 16:
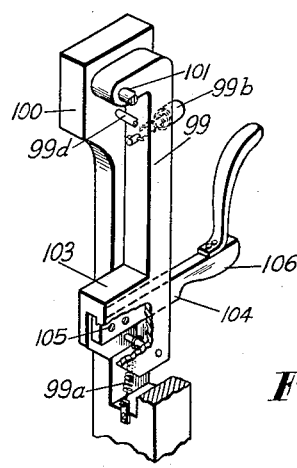
Figure 16 is a detail in perspective of the unit illustrated in Figure 15, parts being shown in section.

Each of the combined blow-head and tongs units 56 is carried by a radially projecting casting 58 which has its inner end bolted to the peripheral portion of the table 47 of the turret as indicated at 59. Each casting carries an electric motor 60 having a driving shaft 61 projecting therefrom which projects into a worm-and-gear housing 62 which is carried by the outer end of casting 58. Within the housing 62, as indicated in Figure 15, a worm gear 63 is rotatably mounted. This worm gear 63 is carried by and keyed to a sleeve 64 which has its upper end rotatably mounted in a bushing 65 at the top of the housing 62 and has a flange 66 intermediate its ends which rests on a ball bearing 67 at the bottom of the housing 62. A shaft 68 extends through the sleeve 64 and is splined therein. This shaft extends through the housing 62 and projects above and below the housing.

The lower end of the sleeve 64 projects from the housing 62 and has a block 69 keyed thereto. This block 69 has metal bars 70 secured thereto at each corner and extending downwardly therefrom. The extreme lower ends of these bars 70 are joined together by links 71 and cylindrical spacers 72 which are disposed at right angles to the links 71. Strips 73 secured to bars 70 are also provided to make the structure more rigid. The extreme lower end of the shaft 68 carries a block 74 which has outwardly projecting portions 75 that project between the bars 70 for guiding vertical movement of the block 74 which is produced by vertical movement of shaft 68. The outer ends of the portions 75 have brackets 76 secured thereto. Each of these brackets extends downwardly and inwardly. The inwardly extending portion of each bracket 76 is provided with a setscrew 77 threaded upwardly therethrough. The lower portion of the block 74 carries pivoted tong members 78. Each tong member has its upper end pivoted to the lower portion of block 74 and 79. The upper end of each tong member is provided with an outwardly projecting portion 80 which is normally forced downwardly by means of small spring-pressed plungers 81 mounted in the lower portion of block 74. Portions 80 when in their lowermost position contact with the upper ends of adjustable screws 77. Screws 77 are provided for controlling the gripping action of the tongs on the glass article. Each of the tong members has a gripping portion 82 formed on its lower end which is adapted to extend substantially halfway around the upper end of the blank. The tongs 78 are disposed between downwardly extending guide member 83 carried by the block 74. In these guide members for vertical movement is mounted a horizontal plate 84 which has a downwardly extending sleeve 85 secured thereto by means of a threaded connection of the type shown at 85a. The sleeve 85 slides through a plate 86 secured rigidly to the extreme lower end of members 83. A compression spring 87 disposed around sleeve 85 between plates 84 and 86 normally keeps the sleeve 85 in its uppermost position. A blow cap 88 adapted to engage and seal the upper end of the blank is carried by a plunger 89 which extends upwardly into the sleeve 85. This plunger is forced downwardly by means of a spring 90 surrounding a guide pin 91 secured to the upper end of member 89. The pin 91 extends upwardly through plate 84 and is slidable therein. This pin has a flange 91a formed thereon which cooperates with a shoulder 91b to limit downward movement of pin 91.

As previously indicated, the shaft 68 is vertically movable in the sleeve 64. With the parts in the position illustrated in Figure 15, the shaft 68 is in its uppermost position. When in this position, the tongs are closed. The shaft is provided with an air passageway 92 extending substantially throughout the length thereof. The lower end of this passageway is connected by means of a flexible conduit 93 to an air passageway 94 provided in the blow-cap 88. When the parts are in the positions illustrated in this figure, the tongs will firmly grip the blank and the upper end of the blank will be sealed by the blowcap 88.

Figure 17:
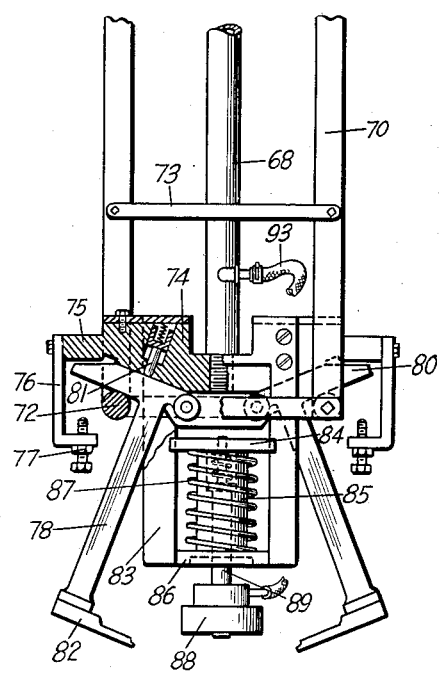
Figure 17 is a view mainly in side elevation but partly in section of a portion of the structure illustrated in Figure 15 but showing the tongs open.

If the shaft 68 is moved downwardly, the member 74 carried thereby will move downwardly relative to the bars 70. When the outwardly projecting portions 80 of the tongs 78 strike the bars 72 carried by the lower ends of bars 70, the tongs 78 will swing outwardly and the portions 80 thereof will be forced upwardly against the resistance of the plungers 81, as indicated in Figure 17. The member 74 is inclined at 95 to permit the upward swinging movement of portions 80. Thus, the blank will be disengaged by the tongs upon downward movement of shaft 68.

Figure 27:
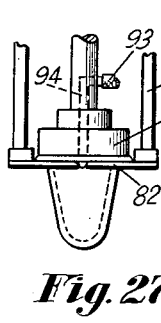
Figure 27 shows the blank suspended from the tongs after it has been raised from the blank mold.
Figure 28:
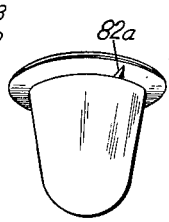
Figure 28 is a perspective view of the blank at the time it is gripped by the tongs showing a lug formed thereon by the tongs which prevents rotation of the blank relative to the tongs.

Upon upward movement of the shaft 68, the member 74 will move upwardly. At the same time the portions 80 of the tongs 78 will move away from spacers 72 permitting the plungers 81 to swing the tongs inwardly until they grip the upper portion of the blank. The blow-cap will be forced downwardly by the spring-pressed sleeve 85 and plunger 89 to such as extent that simultaneously with the gripping action by the tongs, the upper end of the blank will engage the blow-head and force it upwardly against the pressure of the springs 90 and 87. Thus, there will be a resilient engagement between the blow-cap and the upper end of the blank. This will permit tight sealing of the upper end of the blank by means of the blow-cap without danger of injury to the blank. Thus, the blank will be engaged by the tongs and the blow-cap upon upward movement of shaft 68. The portion 82 almost completely enclose the upper end of the blank but there will be a slight space between these adjacent portions at diametrically opposed points. Consequently, at such points small lugs 82a (Figures 27 and 28) will be formed, because the blank will be comparatively hot when gripped by the tongs. These lugs serve to prevent rotation of the blank relative to the tongs.

The extreme upper end of the shaft 68 carries a collar 96 which is secured thereto in such a manner as to permit rotation of the shaft in the collar. This collar 96 has a flange 97 that is adapted to be engaged by the portion 98 of a suitable member in order to raise or lower the shaft 68. Cylinder and piston mechanisms carrying portions 98 are provided at suitable locations on the machine, as will be later explained, for raising and lowering shaft 68. In order to lock the shaft 68 in its uppermost position, a latch member 99 is carried by the upper end of a standard 100 projecting upwardly from the housing 62 to which it is secured. This latch member 99 is pivoted to the bifurcated upper end of the support 100 as at 101. It is provided with a bevelled lower corner 102. When the shaft 68 moves upwardly, the collar 97 will engage the bevelled surface 102 of the latch forcing the latch outwardly about the pivot 101. The latch is also provided with a horizontal surface 103 and when the collar 97 reaches a suitable height, the latch is forced inwardly by means of coil spring 99a, which is connected to latch 99 and support 100, permitting the flange of the collar to rest on the surface 103 and hold the shaft 68 in its uppermost position.

If the coil spring 99a fails to force the latch 99 inwardly, additional means which I provide will do this. For this purpose the latch is provided with a spring cushioned button 99b. During the next movement of the turret after the shaft 68 is moved into its uppermost position, a stationary cam 99c (Figure 1) mounted on a support depending from arm 31, will strike the button forcing latch 99 inwardly if spring 99a has not forced it inwardly. Stop 99d is provided for limiting inward movement of latch 99.

If the shaft 68 failed to move high enough so it would be locked in position by latch 99 or if for any other reason it failed to be locked in its uppermost position, during continued movement of the machine the tongs and blow mold unit carried thereby would drop down and cause serious damage to the machine, as will be understood more clearly during the following description of the machine. Therefore, I provide a safety so that if for any reason the shaft 68 fails to latch on the up stroke, movement of both the blow mold table and the turret ceases. This safety is controlled by a bleeder valve 68a (Figures 1 and 15) which is located adjacent cylinder and piston unit 198 and is so positioned that an actuating member 68b thereof will be engaged by each of the shafts 68 whenever such shaft is raised to its uppermost position and is locked in such position. However, if shaft 68 fails to move upwardly to such a position as to lock it in its upper position, the member 68b will not be engaged by the shaft. When the member 68b is engaged by the shaft 68, the safety will not operate. However, if the member 68b is not engaged by the shaft 68, the safety will then operate. The structure and operation of this safety will be described in detail hereinafter.

An outwardly projecting cam arm 104 has its inner end rigidly secured between the bifurcations at the lower end of the latch 99 as at 105. If the outer end of this arm 104 is swung upwardly, the portion 103 of the latch will be disengaged from the flange 97 of collar 96. A cam surface 106 is provided on the outer end of the lever 104 and is adapted to be engaged by suitable means for forcing it upwardly. As will be later explained, such means is provided at a suitable point on the machine. A handle is secured to the outer end of the lever 104 so that whenever desired the latch may be released manually.

It will be noted that the collar 96 is provided with an annular groove 108 in communication with transverse bores 109 which have their inner ends connected to the air passageway 92 in the shaft 68. A small pipe 110 passes through the collar 96 and has its inner end in communication with the groove 108. By this means air may be supplied to the passageway 92 at the proper time, as will be later explained.

It will be apparent that whenever the electric motor 60 is energized, the worm gear 63 will be driven. This will cause the sleeve 64, the block 69 and the frame carried thereby to rotate. It will also cause the shaft 68, the block 74 carried thereby, and the tongs 78 and other parts carried by the block, to rotate. Thus, the combined blow-head and tongs unit will rotate whenever the motor 60 is energized.

I provide means for controlling the supply of air to the passage 92 in the shaft 68. As will appear later, this means will permit a puff of air to enter this passage at a certain time and subsequently will cause air under pressure to be supplied to said passage for the purpose of blowing the parison to final form in the blow mold. I also provide means for controlling the energizing of each of the motors 60 so that they will be energized and deenergized during certain predetermined periods.

The means for supplying air to the passage 92 in shaft 68 includes a flexible conduit 111 (Figure 1) which is connected to the short pipe 119 in the collar 96 carried by the shaft. This conduit 111 is connected to a valve housing 112 which is bolted to the casting 58. An air pipe 113 connects this housing 112 to an air tank 112a provided with an air pressure gauge and to an annular passageway 114 formed within the casting 47 of the turret. A passageway 115 leads through an annular member 116 which rotates with member 45 to annular groove 117 formed in member 116 which is always in communication with a passageway 118 formed in the column 50. This passageway 118 is also in communication with a vertical passageway 119 extending upwardly through the column 50. The upper end of this passageway 119 is in communication with an air pipe 120 which supplies constant air under pressure to the passageway 119. It will be apparent that with this arrangement the stationary air pipe 120 will always be connected to the various air pipes 113 which are carried by the rotatable turret.

Valve housing 112 is illustrated best in Figures 10 and 11. The pipe 113 is connected to a chamber 121 formed within the housing 112. The conduit 111 is connected to branches 122 and 123 which are connected to passageways 124 and 125, respectively, which have their inner ends connected to chamber 121. A plunger 126 is slidably mounted in the wall of the housing and projects through the passageway 124. A valve seat 127 is formed on the inner end of passage 124 and a valve member 128 carried by the plunger is normally held on said seat by a spring 129. A similar plunger 130 is provided in the lower portion of the housing and extends through the passageway 125. This plunger carries a valve 131 which normally seats on a seat 132 formed at the inner end of passageway 125. A spring 133 normally holds this valve on its seat. The outer end of plunger 126 has a member 134 mounted thereon which has a button on its extreme outer end, an annular groove 135 inwardly of the button and a frusto-conical portion 136 inwardly of the groove. The outer end of plunger 130 has a similar member 137 thereon. A latch member 138 is pivoted to the housing 112 adjacent the outer end of the plunger 126. This latch member is normally forced downwardly about its pivot by means of a spring 139. It is provided with a cam portion 140 on its upper end which is adapted to be engaged by suitable means to swing it upwardly. The member 138 is also provided with a finger 141 which will be engaged by the portion 136 at a certain instant and will project into the groove 135 when the plunger 126 is in its inwardmost position. A similar latch 142 is provided adjacent plunger 130.

The plunger 126 and associated valve is provided for controlling the flow of air under pressure for blowing the parison into final form in the blow mold. The plunger 130 and valve 131 are provided for controlling the application of a puff of air to the blank. When plunger 126 is forced inwardly, the valve 128 is unseated allowing the air from the main line 113 to enter chamber 124 and then pass through conduit 111 to the blow-head. When plunger 130 is forced inwardly, the valve 131 will be unseated allowing a puff of air to enter from line 113 into chamber 121 and thence into conduit 111. Manually operable throttle valves 122a and 123a are provided in the branches 122 and 123, respectively, to adjust the flow of air therethrough.

Means is provided for forcing the plungers 126 and 130 inwardly at the proper instants and locking them and for unlocking them at the proper instants to permit them to move outwardly. This means comprises a stationary drum 134a (Figure 1) which is provided with a series of vertically spaced annular grooves 135a which are T-shaped in cross section. This drum 134a is secured to the column 50 so that it will be stationary. Thus, the housings 112 which are carried by the rotatable turret will rotate relative to the drum 134a. Each of the grooves 135a has a contact finger 136a mounted therein at a suitable point. These fingers are adjustable along the grooves. One of the fingers will engage the plunger 126 at the proper instant. It will engage the outer end of the plunger forcing it inwardly and unseating valve 128. At the same time, the frusto-conical portion 136 will swing the latch 141 upwardly until it enters the groove 135. This will lock the plunger in its inwardmost position. Another contact finger in a different groove will subsequently contact with the portion 140 of the latch, swinging the latch upwardly out of groove 135 and permitting the spring 129 to force the plunger 126 outwardly and close valve 128. Contact fingers will strike plunger 130 and latch 142 and operate them in a similar manner. It will be apparent that the various contact fingers may be so arranged relative to each other as to bring about the various movements in the proper sequence and in proper timed relationship.

The electric switch for controlling the energizing and deenergizing of the electric motor 60 is disposed within a housing 143 (Figure 1) mounted on the top of the housing 112. A cable 144 leads from the motor 60 and is connected to contact members 145 (Figure 10) in housing 143. Movable contact members 146 are carried on the inner end of a plunger 147 which is slidably carried by support 147a. This plunger 147 has a member 148 on its outer end adapted to be engaged by one of the fingers 136a which will force it inwardly and bring the contacts 145 and 146 together. A latch 138a which is like latch 138 will engage the outer end of the plunger and lock it in its inwardmost position. Another finger 136a will subsequently engage portion 149 of the latch in order to again permit outward movement of the plunger. Spring-pressed plungers 150 are provided in the contacts 145 so that they will resiliently contact with the contacts 146. Springs 150a are connected to a stationary member 150c secured to support 147a and to member 150b secured to plunger 147. These springs will serve to return plunger 147 to its outermost position when released by the latch 138a. Contact fingers 136a are so disposed as to actuate plunger 147 and latch 138a in the proper sequence.

The electric contacts 146 are connected to a cable 155 (Figure 1) leading from the housing 143. This cable has a plug 156 on its opposite end which is adapted to be plugged into an outlet 157 disposed in a drum 158. The drum 158, as indicated in Figures 1 and 13, is so mounted on the casting 45 that it will rotate therewith. Thus, the drum rotates with the turret and the units 56 carried thereby. The outlets 157 are connected by suitable wires to a pair of contact members or wipers 159 adapted to rotate with the drum 158. These members are provided with portions which wipe against contact rings 160 which are stationary, being keyed to column 50 and being held in spaced relationship by bolts and insulators indicated generally by numeral 160a. A cable 161 (Figures 1 and 13) is connected to the stationary rings 160 and to a source of power. This cable passes through an air-tight plug 161a provided in column 50. Thus, with this arrangement I provide effective means for conducting current to the motors 60 which rotate with the turret.

As previously indicated, directly below each unit 56 I provide a blow mold unit 57. The units 57 are also carried by the rotatable turret.

Each unit 57 embodies an outwardly projecting arm 162 (Figure 1) which has its inner end mounted upon three spaced vertically disposed guide posts 163. These posts 163 have their upper ends secured to the portion 47 of casting 45 and their lower ends secured to portion 48 of casting 46. The inner end of the arm 162 is mounted for vertical movement on these posts. This mounting will prevent lateral swinging of the outer end of the arm relative to its mounting adjacent its outer end. The arm 162 (Figures 7, 8 and 9) has a downwardly extending portion 164 and an outwardly extending horizontal portion 165. The bottom 166 of the blow-mold 165 is removably supported on this portion 165. The body portion of each blow-mold 167 is made in two halves which are hingedly connected together and to the portion 164 of arm 162 as at 168.

Means is provided for closing and opening the blow-mold. Thus, links 169 have their outer ends pivotally connected as at 170 to the blow-mold sections or halves. A cross arm 171 is pivotally connected to the rear ends of both of the links 169 at 172. This cross arm is connected by a rod 173 to a block 174, a cushioning spring 175 being provided within the block around the rod 173. This block 174 is slidably mounted in guides 175a on the arm 162. The cross arm 171 operates in slots 176 formed in a portion of the arm 162. The block 174 has a pin 177 extending downwardly therefrom through a slot 176a in the arm 162. This pin 177 has a portion 178 on its lower end that is adapted to be engaged by suitable means for moving block 174 inwardly or outwardly on the arm 162 to open or close the blow-mold.

It will be apparent that when the block 174 is moved outwardly, the cross head 171 will be moved outwardly forcing links 169 outwardly. This will cause the sections of the blow-mold to swing together. When the block 174 is moved rearwardly on the arm 162, the cross head 171 will be moved rearwardly drawing the links 169 rearwardly and causing the blow-mold sections to swing outwardly around the point 168.

I provide suitable means for locking the blow-mold sections together during the blowing operation. As illustrated, the blow-mold sections are provided with lugs 179 which will be disposed together when the blow-mold is closed. A lever 180 is pivoted to the outer end of the horizontal portion 165 of the blow-mold supporting arm as at 181. This lever has a yoke 182 at its upper end which will engage the outer bevelled surfaces of lugs 179 and force them tightly together when the blow-mold is closed and when the upper end of the lever is swung inwardly about the pivot 181. Thus, this lever and the cooperating lugs 179 serve to lock the blow-mold sections together. The lever is provided with a portion 183 at its lower end which will engage the lower surface of portion 165 of the arm to limit outward swinging of the lever. It is also provided with an outwardly extending portion 183a which carries a roller 184 on its outer end. Roller 184 is swiveled on member 183a but is normally held in a position where its axis is perpendicular to lever 180 by means of compression springs 184a. This roller is adapted to be engaged by a track at a suitable time in order to swing the lever 180 upwardly and inwardly. Directly below the vertical portion 164 of arm 162, a roller 185 is carried by the arm. This roller is adapted to be engaged by a track which will control vertical movement of arm 162 on the posts 163. A small roller 185a is provided adjacent roller 185 for a purpose to be described later.

The blow molds which are used on this machine are preferably of the paste mold type. In order to cool the blow molds after the articles are formed therein and to wet the interiors of the molds I provide the water tank 186 into which the molds pass at the proper time and are submerged in the water therein and from which the molds emerge at the proper time. The water tank 186 is of annular form. It will be apparent that the shaping and finishing unit is so arranged relative to the blank-forming unit that they overlap each other in the manner illustrated in Figure 2. The water tank consequently extends beneath the blank mold table. Furthermore, as the turret 44 rotates, the combined tongs and blow-head units 56 will move over the blank mold table 5 and the blow-mold units 57 will move underneath the blank mold table and through the water tank.

Figure 3:
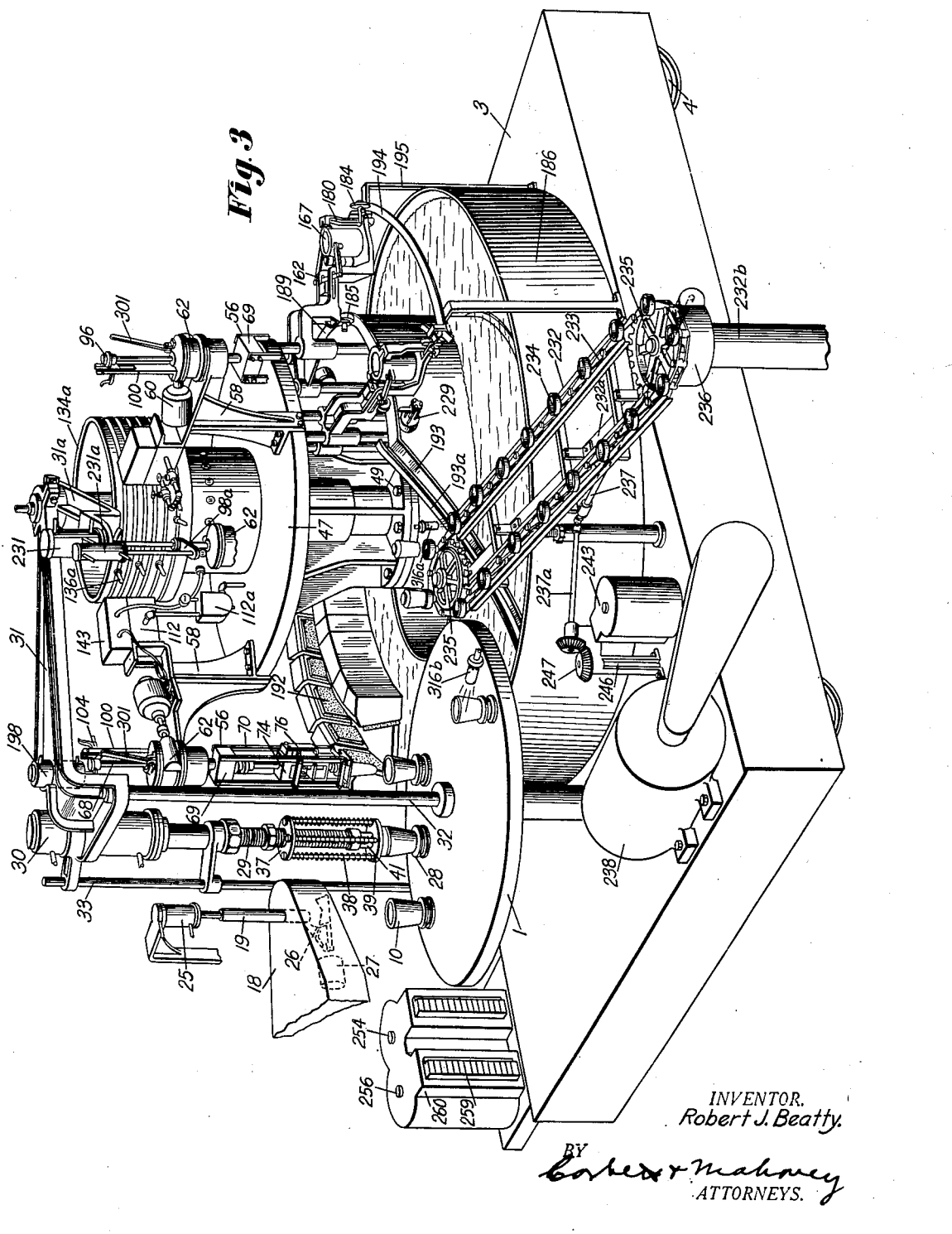
Figure 3 is a perspective view of the machine with a large number of the parts omitted for the sake of clearness.
Figure 4:
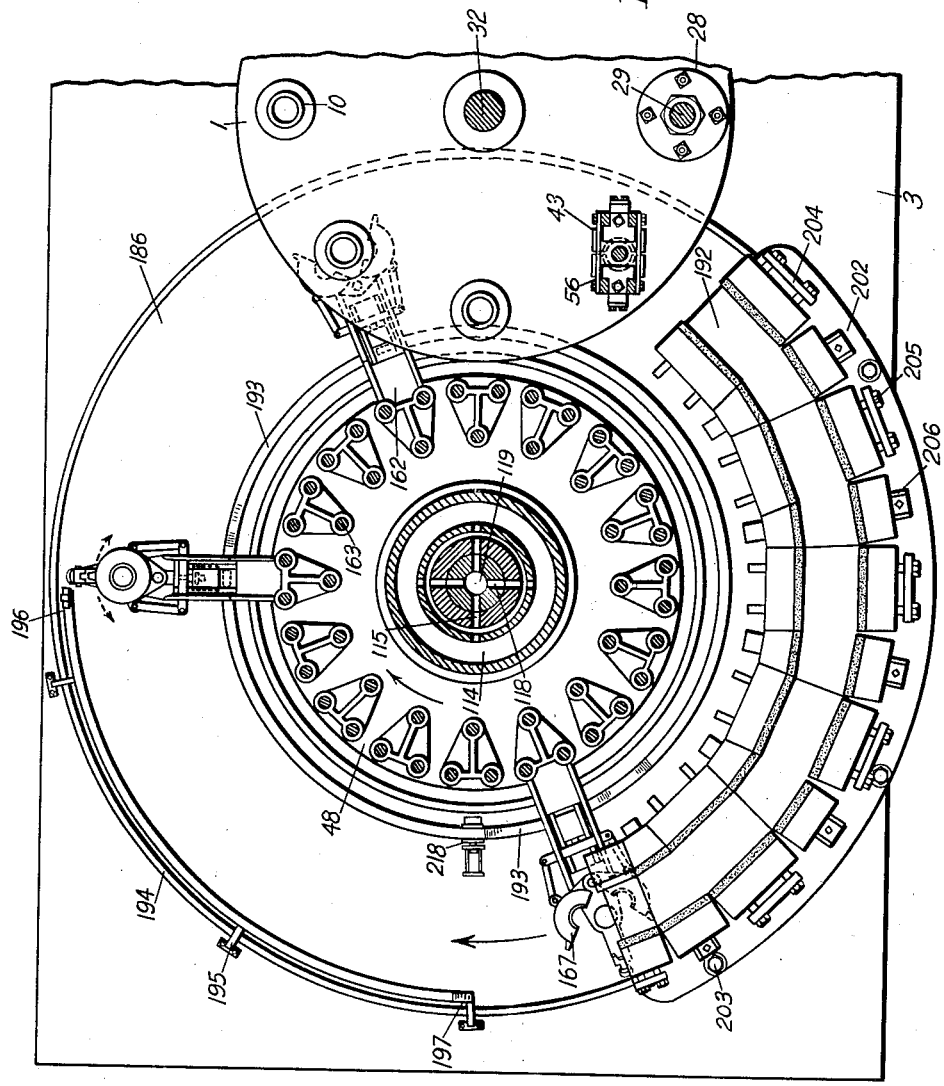
Figure 4 is a horizontal section taken substantially on line 4—4 of Figure 1.

A track 187 (Figure 1) is provided for controlling vertical movement of the blow-mold units by cooperation with the rollers 185 carried by the arms 162. This track 187 is supported on the upper edge of a supporting casting 188 which extends into the water trough 186 and has its lower edge secured to the base of the machine. This track, as indicated best in Figure 3, is provided with a high portion 189 extending substantially from the station indicated by the numeral 190 in Figure 2 where the blowing operation begins, to the take-off station located substantially at the point indicated by the numeral 191 in this figure. The track is provided with a low portion extending beneath the blank mold table 5 and beneath a heating chamber 192 to be subsequently described. Inclined portions 193 connect the high and low sections of the track. When the blow mold units are on the high section of the track, the blow molds will not be submerged in the water in the trough 186. However, when the blow molds are on the low sections of the track, they will be submerged in the water in the trough. A track 194 is supported on the upper end of supports 195 secured to the top of base 3. This track is adapted to engage the rollers 184 carried by levers 180 in order to force the levers inwardly so as to lock the blow-mold sections together. The rollers 184 will contact resiliently but firmly with the track. This track extends substantially from the station 190 where the blowing operation begins to the station indicated by the numeral 196 in Figure 2 where the blowing operation ends. Each end of this track is provided with sections 197 which are inclined so as to gradually swing the lever 180 inwardly when locking the molds and to permit it to gradually swing outwardly when unlocking the molds.

As previously indicated, the point at which the blank is lifted from the blank mold by the combined tongs and blow-head unit 56 is located substantially at the point indicated by the numeral 43. Therefore, at this point I provide means for raising the shaft 68 and operating the tongs so that they will grip the blank. This means comprises a cylinder and piston unit 198 (Figures 1 and 3) which is supported directly above the station 43 by a portion of the arm 31. This unit 198 has a piston rod 199 extending downwardly therefrom having the portion 98 formed thereon which is adapted to engage the flange 97 of collar 96 in order to move the shaft 68 upwardly and cause the tongs to grip the upper end of the blank which will be projecting slightly from the blank mold.

Rotation of the turret will cause the blanks suspended from the units 56 to be carried into the heating chamber or trough 192. The shaft 68 will be locked in its uppermost position by latch 99. The heating chamber 192 is supported at such a height that it will be at a level substantially corresponding to that at which the blank is supported. The heating chamber is preferably of considerable length extending from the station 200 (Figure 2) to the station 201. However, it may be of different lengths depending upon different conditions encountered in operation. The low portion of the track 189 is also disposed beneath this heating chamber so that the blow-mold units will pass beneath this heating chamber.

The construction of the heating unit 192 is illustrated best in Figures 3, 4, 18, 19 and 20. It comprises an arcuate chamber or passageway through which the suspended blanks are moved step by step and are heated during their passage therethrough. At the same time the blanks are heated, a puff of air is supplied thereto to cause the blanks to be extended into parison form.

The main support for the heating chamber 192 comprises an arcuate beam 202 which is supported on the upper end of posts 203 which have their lower end secured to the base 3 (Figure 1). At spaced intervals the member 202 has upwardly projecting lugs 204 each of which carries a pair of inwardly projecting spaced rods 205. Alternating with the lugs 204 are members 206 carried by member 202 and which are provided with sockets for receiving the outer ends of bars 207. These bars are held in the sockets by screw bolts 208. Each pair of rods 205 carries an inner burner 209 and an outer burner 210 which face each other. These burners are spaced from each other and may be adjusted on the rods 205 relative to each other. They may be held in adjusted position by set screws 211. The bars 207 carry an outer burner 212 and an inner cooperating unit 213 which is not a burner unit. The burner unit 212 and the unit 213 are adjustable on the bar 207 and are held in adjusted position by means of setscrews 214 passing through a slot in the bar 207. The burner units 210 and 212 cooperate to form the outer wall of the heating chamber. The burner units 209 and the units 213 cooperate to form the inner wall of the heating chamber.

Figure 18:
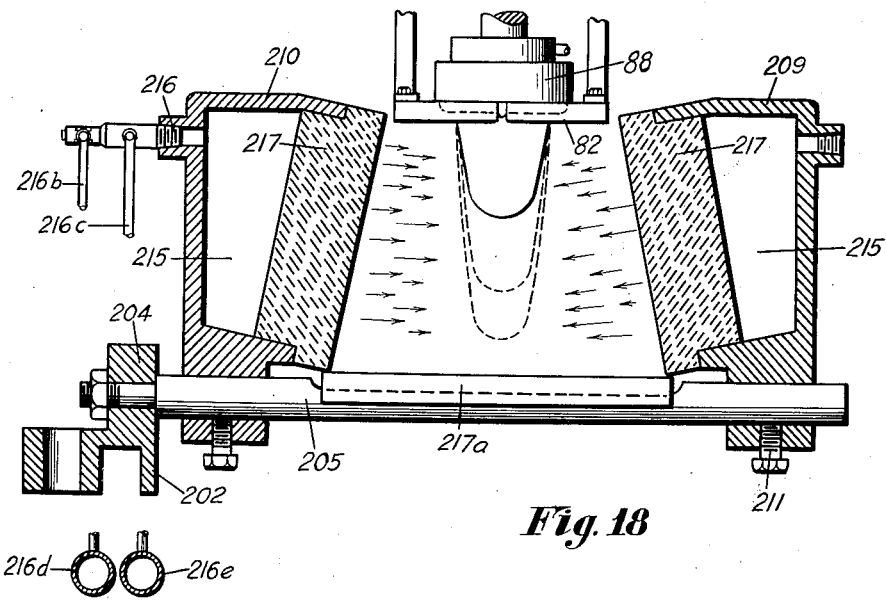
Figure 18 is a transverse section taken through the heating trough substantially along line 18—18 of Figure 19 and showing a blank suspended from the tongs in position therein.
Figure 19:
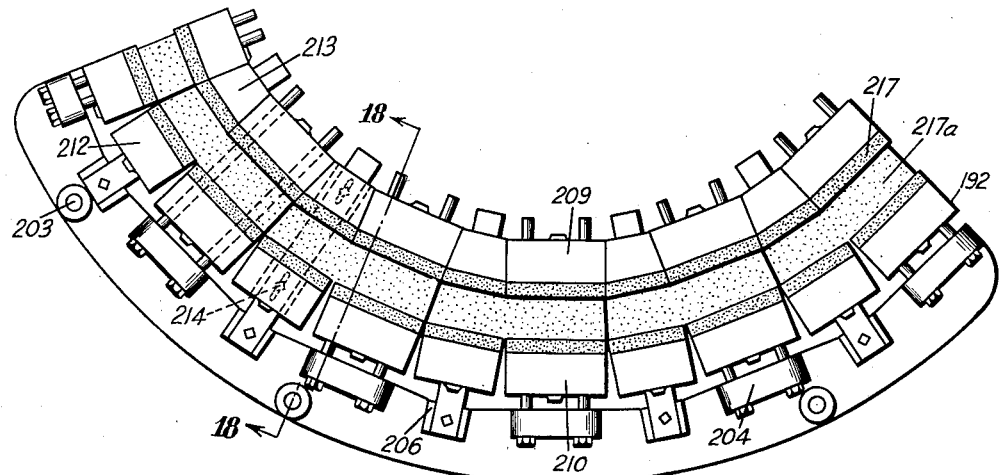
Figure 19 is a plan view of the heating trough.
Figure 20:
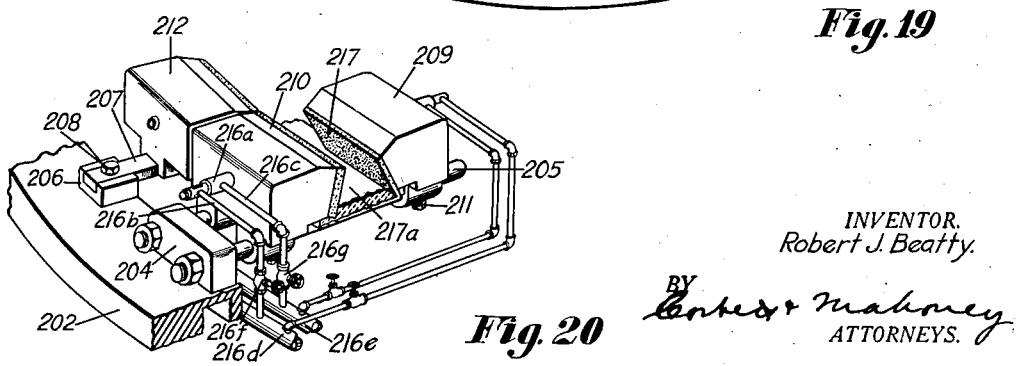
Figure 20 is a perspective view of a portion of the heating trough.

The construction of the units 209 and 210 is illustrated in Figure 18. It is to be understood that the burner unit 212 is substantially the same as the burner units 209 and 210. Furthermore, the unit 213 is substantially the same as the outer units with the exception that the gas mixture for combustion is not supplied to the interior thereof.

As indicated in Figure 18, each burner unit comprises a metal housing having a combustion chamber 215 formed therein. An inlet for air and gas mixture is provided at 216. A porous refractory brick 217 forms the inner wall of the burner unit. This brick is mounted in the burner housing in such a manner that it is inclined slightly in the manner illustrated in Figure 18. It may be cemented or otherwise secured in position. The bricks 217 of the inner and outer units 209 and 210 will converge towards each other at their upper ends as indicated in this figure. The porous bricks are of such a nature that when the mixture in the chamber 215 is ignited, the flames and hot products of combustion will seep through the bricks 217 and will heat them to incandescence. The bricks 217 serve to prevent waste of heat and also serve to prevent the flames from hitting the glass blank with pressure so as to cause improper lateral distortion thereof. Due to the fact that the bricks of the inner and outer units are inclined towards each other, there will be a tendency for the heat to be directed downwardly to a slight extent and this will offset the normal tendency of the heat to rise.

A gas and air mixer 216a leads into inlet 216. Air and gas pipes 216b and 216c lead to this mixer from manifold pipes 216d and 216e and are controlled by manually operable valves 216f and 216g. Thus each burner may be controlled independently of the others. For example, the burners may be adjusted so that the heat developed by the burners gradually decreases from the inlet end of the heating trough to the outlet end thereof to prevent overheating of the blanks.

Between the inner and outer walls of the heating trough and resting on the rods 205 and bars 207 are a plurality of refractory baffle members 217a. These members 217a serve as a bottom for the heating trough.

As the blanks pass through this heating chamber or trough 192, the chilled outer skin produced by pressing the blank in the blank mold is reheated and remelted. At the same time a puff of air is supplied to the interior of the blank so that it will be extended into parison form. The contact fingers 136a carried by drum 134a are so arranged that they will strike the plungers 130 and the latches 142 to supply the proper puffs of air to the interiors of the blanks during their passage through the heating chamber. Furthermore, the fingers 136a of drum 134a which operate the plungers 148 and the latches 138a of the electric switches for controlling motors 60, are so arranged that the combined tongs and blow-head units 56 will rotate during their passage through the heating chamber 192. In fact, this rotation will continue until the units 56 reach the take-off station 191. Thus, the blanks are rotated as they pass through the heating chamber. This insures uniform heating.

As the units 56 leave the heating chamber 192, the blow-mold units will rise to meet them. The track 187 is so arranged that the bottom 166 of the blow mold will be brought directly below the suspended parison which will be carried by the cooperating unit 56. It is then desirable to close the blow-mold and lock it. Consequently, adjacent this station I provide means for closing the blow-mold.

This means is illustrated best in Figures 1 and 9. It comprises a cylinder 218 having a piston 219 operating therein. The cylinder 218 may be supported by the track-supporting casting 188. The piston 219 is provided with an outwardly projecting piston rod 220. The outer end of this piston rod 220 carries a plate 221. This plate is provided with notches 222 in its edges which cooperate with guide rods 223. Three of these rods are provided and they have their inner ends secured to the cylinder as at 224. Their outer ends are secured to a plate 225 which will maintain them in spaced relationship. The plate 221 has a finger 226 pivoted thereto as at 227. A spring 228a normally holds this finger in vertical position. Swinging of this finger in the direction of movement of the blow-mold is permitted but swinging in the opposite direction is prevented by a stop 228.

The finger 226 is so located that when the blow-mold moves to the station where it is to be closed, the finger 226 will pass behind the member 178 carried by the pin 177 which depends from the block 174. When the members 226 and 178 move into cooperative relationship, the finger 226 may move slightly against the resistance of the spring 228a. The members 226 and 178 will be positioned in the manner illustrated in Figure 7. If air is now applied to the cylinder 218, the piston 219 will move the finger 226 outwardly moving the block 174 outwardly and causing the blow-mold sections to come together. The next movement of the rotatable turret is adapted to bring the roller 184 of the locking lever 180 of that particular blow-mold unit into engagement with the track 194. When this track is engaged by the roller 184 the lever will be swung into position where it locks the blow-mold sections together. Thus, it will be apparent that the blow-mold is closed and then immediately after, the locking means functions to lock the sections together.

The locking means functions during the entire blowing operation. Operation of the plunger 126, which controls the supply of blowing air pressure to the mold, is so timed that blowing pressure will be supplied thereto during movement between the stations 190 and 196 (Figure 2). Also, during the blowing operation the rotation of the combined tongs and blow-heads continues so that the parisons will be rotated in the paste molds during the blowing operation and, consequently, the proper polish will be imparted to the blown article. When the article is completely blown, which will be substantially at the station 196, the roller 184 will ride down the inclined portion 197 of the track 194 and will unlock the blow-mold. To ensure that roller 184 will ride down the incline 197 and unlock the blow-mold, adjacent the station 196 I provide cam means, associated with the upper end of inclined portion 197 of the track, as illustrated best in Figure 9. This means comprises a flexible cam member 197a adapted to engage roller 184 and which is supported by a support 197b secured to the portion 197. After the blow-mold is unlocked it is desirable to open the blow-mold and therefore at the next station I provide means for opening the blow-mold.

This blow-mold-opening means comprises a cylinder and piston unit 229 (Figures 1, 3 and 4) which is exactly the same as the cylinder and piston unit 218. However, in this case the finger 226 will be in its outermost position and the member 178 will pass behind this finger. When air is supplied to the unit, the piston will be moved inwardly and the finger 226 will draw the block 174 inwardly. This will cause opening of the blow-mold sections. At the time the blow-mold is opened it is preferable that rotation of the unit 56 has stopped.

Shortly after the blow-molds leave the station where they are opened, they begin to move downwardly into the water tank where they will be cooled and will be wet. Roller 185a cooperates with a flange 193a (Figures 3 and 7) on track section 193 to ensure that the blow-mold supporting arms 162 will be moved downwardly. It will be apparent that the blown article will now be suspended from the unit 56. It is now desirable to remove the article from the machine. This is accomplished at the station 191 (Figure 2) which may be the next station after that where the blow-mold is opened.

Just prior to the time the unit 56 reaches the take-off station 191, the cam surface 106 of the latch 104 is brought into engagement with a cam member 230 (Figure 1) disposed on a suitable bracket secured to a supporting arm 31a extending over the turret and having its inner end secured to column 50 (Figure 3). Thus, the collar 97 carried by shaft 68 is released from the latch 104. The shaft 68 will then begin to move downwardly. However, in order to positively move the shaft downwardly I provide at the take-off station a cylinder and piston unit 231 mounted on the outer end of support 31a. This unit is exactly the same as the cylinder and piston unit 198 which is provided for lifting the shaft. However, the portion 98 of this unit will engage the top of the collar 97 and when air is supplied to the unit, the piston will be moved downwardly in the cylinder forcing the shaft 68 downwardly. This will release the blown article from the tongs 78.

In order to prevent the shaft 68 from dropping too quickly and jarring the article, I provide an auxiliary cylinder and piston unit 231a. The lower end of the piston rod of this unit has a finger 98a secured thereto. This finger will be located below collar 97 when the unit 56 moves to this station where the article is to be lowered. The pistons of the units 231 and 231a are moved downwardly in unison. During downward movement of shaft 68, the finger 98a is normally spaced below collar 97. However, if shaft 68 begins to drop freely, the finger 98a will contact with collar 97 and restrain this quick movement but will permit gradual downward movement since finger 98a will move downwardly slowly. The next movement of the turret will move the unit 56 away from this position and, consequently, move collar 97 from above finger 98a of unit 231a and from beneath portion 98 of unit 231.

In order to receive the blown article as it is released from the tongs and to remove it from the machine I provide a take-off conveyor 232. This conveyor embodies an endless chain 233 (Figures 2 and 3) having a plurality of spaced article supports or cups 234 thereon. The chain is carried by sprockets 235. The conveyor unit is a portable unit independent of the rest of the machine. It is supported by a horizontal arm 232a extending from a vertical support 232b which is preferably mounted on wheels. It may be positioned relative to the machine in the manner illustrated in Figure 3. It may be moved away from the machine if desired. This conveyor is driven intermittently by means of a Geneva drive of the usual type, disposed in housing 236 on support 232b, and comprising a driven wheel and a driving member. The Geneva drive for the conveyor is driven by a horizontal shaft 237 on the conveyor unit. The inner end of this shaft may be coupled to or uncoupled from, by means of a universal joint, the shaft 237a supported on the base of the machine and driven in a manner to be described. This intermittent movement of the conveyor is timed with the intermittent movement of the turret so that each time an article is released from the tongs at the station 191 a cup or article support 234 of the conveyor will be directly therebeneath.

The tracks which raise and lower the blow molds are preferably made in various length sections and mounted on the base so that they may be interchanged, moved around, and the positions where the blowing operation starts and stops, length of time of blowing, and time in the heating chamber may be varied at will, in accordance with conditions and demands of various types and capacities of ware. I am not limited to having the various stations located where described, but the positions of these stations may vary under various conditions.

Driving and air line connections

As illustrated best in Figure 5, the main driving means comprises a large electric motor 238 mounted on the base 3. This motor drives a transversely extending shaft 239 by means of a chain and sprocket drive 240. The shaft 239 is continuously driven and carries a worm 241 which drives a worm gear 242. This gear 242 is keyed on the lower end of a shaft of a timer drum 243 mounted on the base adjacent motor 238 and provided for timing operation of the fluid-actuated means which controls operation of the glass-feeding plunger 19 and the glass-cutting shears 26.

The shaft 239 carries another worm 244 which meshes with a worm gear 245 disposed on the lower end of a vertical shaft 246. This shaft projects up through the base and its upper end is connected by bevel gears 247 to the horizontal shaft 237a which drives the Geneva drive of the conveyor unit 232.

Interposed in shaft 239 between worms 241 and 244 is a clutch 239a. This clutch is illustrated in detail in the upper portion of Figure 5. The shaft 239 carries another worm 249 which drives the driving member 55 that drives the Geneva member 52 which controls rotation of the turret.

The shaft 239 also carries another worm gear 250 which drives the driving member 9 that, in turn, drives the Geneva member 7 which controls rotation of the blank-mold table 5.

A shaft 251 is disposed at right angles to shaft 239 and these shafts are connected together by bevel gears 252. This shaft carries a worm 253 which drives a vertical shaft upon which timer drum 254 is mounted. It is also provided with a worm 255 which drives a shaft upon which a timer drum 256 is mounted. These timer units are supported on top of the base of the machine and are provided for controlling all of the fluid-actuated means with the exception of those controlled by timer 243.

The shaft 239 rotates continuously and will drive the Geneva drives of the take-off conveyor, turret and blank-mold table continuously. These Geneva drives are synchronized so that the various units will move in proper timed relationship. The timer drums 254 and 256 will also be driven continuously and the timer drum 243 will be driven continuously.

The timer drums 243, 254 and 256 are all the same. Each of these drums has a plurality of vertically spaced annular grooves 257 (Figure 6) formed therein which are T-shaped in cross-section. Contact fingers 258 are adjustably mounted in these grooves. These contact fingers are adapted to operate various valves, poppet valves 259, which control operation of various cylinder and piston units of the machine.

Figure 6:
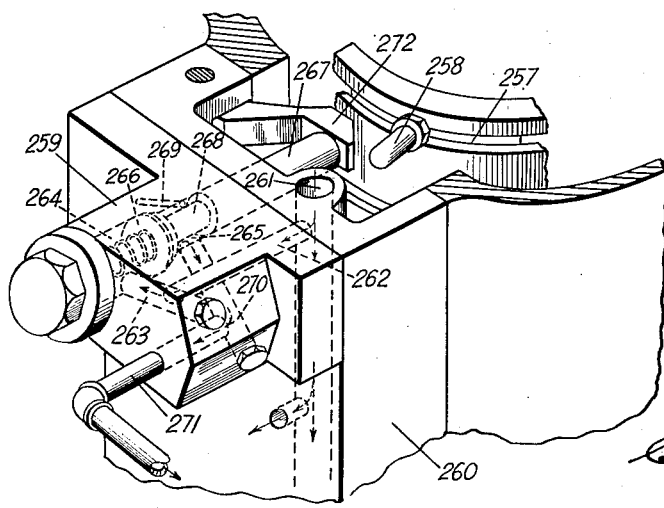
Figure 6 is a perspective view of a portion of a timer which I provide for timing actuation of various fluid-operated parts of my machine.

Each timer drum has a battery of poppet valves 259 associated therewith, the number of which depend upon the number of units to be operated by the timer. As illustrated in Figure 6, each poppet valve comprises a housing formed by a casting 260 disposed adjacent the timer drum. This casting has a vertical passageway 261 supplied with air under constant pressure by means of a main air line. A transversely extending horizontal passage 262 leads from passage 261. A second downwardly inclined passage 263 leads at right angles from passage 262. This passage 263 leads into a chamber 264. Air under pressure will constantly be supplied to this chamber 264. This chamber 264 is provided with an outlet passage 265 under the control of a valve portion 266 which normally rests on a seat formed at the inner end of the outlet passage. The valve portion 266 is carried on the inner end of a plunger 267 which has a reduced portion adjacent thereto as at 268. A vent 269 leads from outlet passage 265 and when valve portion 266 is seated this vent is in communication with the annular space formed around reduced portion 268 of member 267. A downwardly extending passage 270 leads from the annular space formed by reduced portion 268 and always has its upper end in communication with this space. The lower end of this passage 270 connects with a passage 271 which may be connected by means of a pipe to the unit to be operated by the poppet valve. Plunger 267 is adapted to be moved inwardly by a pivoted trigger 272 adapted to be engaged by contact finger 258 carried by the timer drum.

In the operation of this poppet valve, finger 258 will strike trigger 272 forcing plunger 267 inwardly. This will move valve portion 266 from its seat. Vent 269 is so located that the main portion of member 267 will at this time lie over it and close it. Movement of member 267 in this manner allows the air in chamber 264 to flow past valve portion 266, into passage 270, through passage 271 to the unit to be operated. As soon as finger 258 moves past trigger 272, valve portion 266 will seat and vent 269 will be opened. This air supply from chamber 264 will be interrupted. Any air remaining in the unit to be operated, will flow back through passage 271, passage 270, through the annular space around reduced portion 268 of member 267, and will exhaust through vent 269 to the atmosphere. Thus, the poppet valve will supply air under pressure for an instant to the unit to be operated and will then exhaust the air from such unit.

Each of the timer units embodying a timer drum and a series of poppet valves controls a number of two-way valves, each of which controls operation of a cylinder and piston unit of the machine. One of these two-way valves is illustrated in detail in Figure 7.

This two-way valve comprises a cylindrical housing 273 in which a plunger 274 is disposed. This plunger has an enlarged portion 275 at one end, an enlarged portion 276 at the other end, and an intermediate enlarged portion 277, all of which fit tightly within the housing. The housing 273 is provided with two outlets 278 and 279 which are always disposed on opposite sides of enlarged portion 277 of the plunger. These outlets are connected by pipes to opposite ends of the cylinder of the cylinder and piston unit to be controlled thereby. The housing 273 has an inlet 280 leading into one end thereof and an inlet 281 leading into the opposite end thereof. Each of these inlets is connected by a suitable pipe to a poppet valve of a timer unit. A third inlet 282 is provided midway between the ends of housing 273. This inlet is connected to the main air line which will supply air under constant pressure. The housing 273 is also provided with vents 283 and 284.

In the operation of this valve, assuming that plunger 274 is in the position indicated in Figure 7, air from the main line has been previously supplied and is constantly supplied through inlet 282, around plunger 274, through outlet 279 and through the pipe to one end of the cylinder and piston unit to be controlled forcing the piston thereof in one direction and maintaining it in such position. The air in the cylinder on the opposite side of the piston will have exhausted through the pipe connected to such end of the cylinder, through opening 278 around plunger 274 and thence to the atmosphere through vent 284 which will be uncovered at this time. Vent 283 will be covered by member 275 at this time and air entering through inlet 282 will be prevented from reaching vent 284 by portion 277.

If the poppet valve connected to inlet 281 is now actuated, air will flow into housing 273 through such inlet forcing the plunger 274 into the opposite end of the housing. This will connect inlet 282 to outlet 278, will close vent 284 and open vent 283. Air will flow through opening 282, around the plunger, through outlet 278 into the opposite end of the cylinder of the unit to be actuated moving the piston therein. Air from the opposite side of the piston will flow from the cylinder through the pipe connected to opening 279, around plunger 274 and thence to the atmosphere through vent 283. Operation of the poppet valves is so timed that when air is supplied to one end of the housing by one of the poppet valves, air will be permitted to exhaust from the other end of the housing by another poppet valve.

A two-way valve 285 like that described above is connected to the cylinder and piston unit 30 that controls operation of the blank-pressing plunger by two air lines 286. A two-way valve 287 that controls operation of the cylinder and piston unit 12 which controls the means for raising the blank in the blank mold is connected to unit 12 by two air lines 288. A two-way valve 289 which controls the cylinder and piston unit 198 that raises the shafts 68 of the units 56 is connected thereto by two air lines 290. A two-way valve 291 is connected by two lines 292 to the cylinder and piston unit 231 that controls lowering of the shafts 68 of the units 56. A two-way valve 293 is connected by two lines 294 to the cylinder and piston unit 218 which closes the blow-molds. It also actuates a valve 266 which is connected to the cylinder and piston unit 229 which controls opening of the blow-molds. A two-way valve 295 is connected by two lines 296 to cylinder and piston unit 218 that controls closing of the blow-mold.

All of the above-mentioned two-way valves are connected by suitable pipes to poppet valves of either the timer unit 254 or the timer unit 256. The contact members of these timers may be set to bring about the proper sequence and timed relationship in the various operations.

A two-way valve 297 is connected by two lines 298 to the cylinder and piston unit 27 which controls actuation of shears 26. A two-way valve 299 is connected by two lines 300 to the cylinder and piston unit 25 which controls actuation of the glass-feeding plunger 19. Both of these valves are connected to the poppet valves of timer unit 243. The timer is so adjusted as to bring about the proper timed operation of these two cylinder and piston units relative to each other and to the other cylinder and piston units of the machine.

When the clutch 239a is disengaged all action ceases, with the exception of the timer unit 243 which operates the glass feeder. Movement of the blank mold table and the turret will cease. This clutch may be manually operated or may be operated by the safety, previously referred to, which will disengage the clutch if the shaft 68 of each tongs and blow head unit is not locked in its uppermost position.

This clutch is a cone clutch comprising a cone 305 adapted to fit within a movable member 306. A yoke 307 carried by bell-crank lever 308 is adapted to move the clutch members into and out of engagement with each other. This lever 308 is provided with a handle 309 on its outer end by means of which it may be actuated manually. A cylinder and piston unit 310 is connected to lever 308 for operating the clutch. A valve 311 similar to the two-way valves previously referred to is connected to the cylinder and piston unit 310 by means of a line 312. One end of this valve is connected by means of a line 313 to the timer 256. The other end is connected by a line 314 to the bleeder valve 68a. Midway between its ends the valve 311 is connected to the main air line. The bleeder valve 68a is provided with a line 315 connected to the main air line.

The timer 256 is adapted to supply air through the line 313 to one side of the valve 311 at a predetermined instant. Simultaneously, the shaft 68, if it moves upwardly to its proper position, will strike the actuating member 68b operating the valve 68a, will open such valve and will permit air under pressure to flow from line 315 through the valve, through line 314 to the other side of the valve 311. Consequently, the valve 311 will not be actuated since air pressure will be supplied to both ends simultaneously and the opposing pressures will balance each other. The clutch will accordingly remain engaged.

However, if the shaft 68 fails to rise sufficiently to contact the member 68b and open the valve 68a, no pressure will be supplied through the line 314 to the corresponding end of the valve 311. However, the timer 256 at this instant will supply air through the line 313 to the opposite side of the valve 311. This will actuate the valve 311 permitting air to flow from the main line through the valve 311, through the line 312 to the cylinder of the unit 310 forcing the piston thereof upwardly. This will actuate lever 308 moving the member 306 out of engagement with the cone 305. Disengaging of the clutch in this manner will interrupt movement of the blank mold table and the blow mold table.

Thus, it will be apparent that if the shaft 68 is not locked in its uppermost position, the clutch 239a will be disengaged stopping operation of the blank-forming unit and the finishing unit of the machine. However, if the shaft 68 rises to its proper position where it is locked in such position, operation of the units of the machine will not be interrupted. After the safety device operates to disengage the clutch and the condition causing operation of the safety device is corrected, the clutch may again be engaged by manually operating the lever 308 to force the piston of the unit 310 into its lowermost position and to force member 306 of the clutch into engagement with member 305.

The operation

Figure 21:
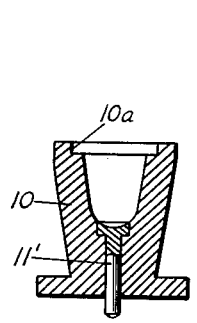
Figure 21 is a view in section showing the blank mold before a charge of glass is supplied thereto.
Figure 22:
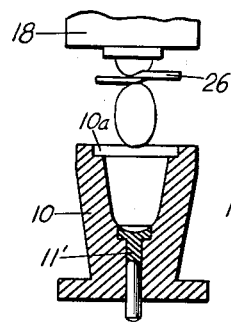
Figure 22 is a similar view showing a charge of glass being severed and falling into the mold.
Figure 23:
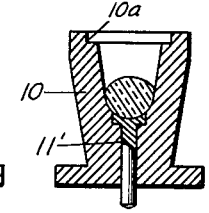
Figure 23 shows the charge in the mold.
Figure 24:
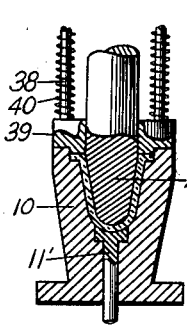
Figure 24 shows the charge being pressed in the blank mold by the pressing plunger.
Figure 25:
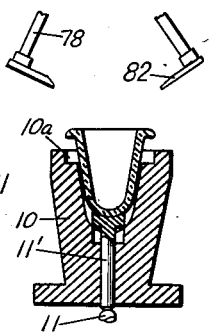
Figure 25 shows the formed blank slightly raised from the blank mold by means of a plunger provided in the bottom of the mold.
Figure 26:
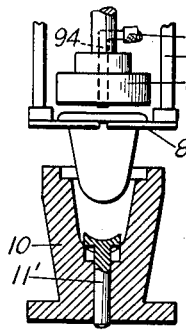
Figure 26 shows the tongs gripping the blank and raising it from the blank mold with the blow cap sealing its upper end.

The various steps in the operation are illustrated in Figures 21 to 34, inclusive. The empty blank mold is illustrated in Figure 21. By intermittent rotation of the blank mold table 5, this mold is brought beneath the orifice of the glass-feeding spout. Simultaneously, a glass charge is sheared by the shears 26 from the glass issuing from the spout, as indicated in Figure 22. This charge will drop into the blank mold. The blank mold table will then move one step until the mold is below the pressing plunger. The pressing plunger will then move down into the mold and press the glass into the form of the blank as indicated in Figure 24. The mold table 5 will then move another step to the lift-out station 43. At this station, as indicated in Figure 25, the lever 15 will be actuated to force the plunger 11' upwardly to a slight extent exposing the upper portion of the blank. Also, at this station, as indicated in Figure 26, the unit 56 which will be directly over the blank mold is actuated by the cylinder and piston unit 198 to grip the upper end of the blank and to lift it from the blank mold.

Figure 29:
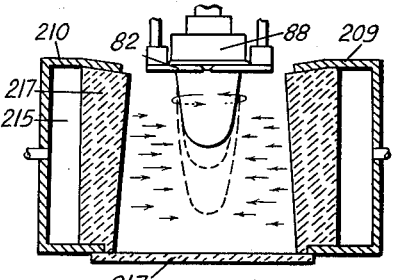
Figure 29 is a diagrammatic view illustrating the blank suspended by the tongs in the heating trough and illustrating by the dotted lines how the heat and the puff of air supplied to the interior thereof will elongate the blank to form a parison therefrom.

The blank will now be suspended from the unit 56 (Figure 27) carried by the rotatable turret of the shaping and finishing unit. As previously indicated, the tongs in gripping the hot blank will form lugs 82a (Figure 28) on the flange of the blank, which will prevent rotation of the blank relative to the tongs. The step-by-step rotation of the turret will carry this unit 56 with the suspended blank away from the blank mold table and into the heating chamber 192. As soon as the suspended blank enters the heating chamber, as indicated in Figure 29, the motor 60 of that particular unit is energized so as to rotate the blank. The step-by-step movement of the unit 56 will carry this blank through the heating chamber. During its passage through this chamber it will rotate continuously so that it will be uniformly heated. This heating operation serves to remelt the chilled skin produced on the outer surface of the blank during the pressing operation in order to permit it to be extended into parison form. Furthermore, as this blank passes through this heating chamber, a puff of air is supplied thereto by operation of the plunger 130 of the valve unit which controls this particular blowhead. This heating and puffing operation causes the blank to be extended into parison form, as indicated by the dotted lines in Figure 29. As previously explained, the burners of this unit are of such a nature that a flame under pressure will not contact with the blank and, consequently, undue lateral distortion of the blank will be avoided.

Figure 30:
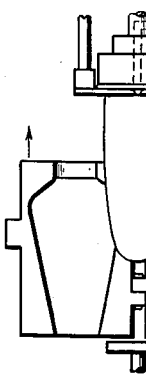
Figure 30 is a view illustrating the blow mold rising to meet the parison.

As the parison leaves the heating chamber 192, the blow-mold which has been submerged in the water tank rises to meet it in the manner illustrated in Figure 30. When the blow mold reaches the station 190, the cylinder and piston unit 218 operates to close the blow-mold around the parison in the manner illustrated in Figure 31. The parison is still rotating at this time and will rotate continuously during the blowing operation in the paste mold. Substantially at this time blowing air pressure is supplied to the interior of the parison by operation of the plunger 126 of the valve unit which controls this particular blow-head. Also, slightly before the blowing pressure is supplied, the lever 180 of the blow-mold unit is actuated to lock the blow-mold sections together. The blowing operation continues until the blow-mold is moved by the intermittent rotation of the turret to substantially the station 196 when the article will be completely blown (Figure 32). At this station the blowing pressure is shut off and the locking lever 180 starts to unlock the blow molds. When the blow-mold unit reaches the point where the cylinder and piston unit 229 is located, this cylinder and piston unit operates to open the blow-mold. This will leave the blown article suspended from the unit 56. Prior to this time the electric motor 60 is deenergized so that rotation of the article stops. Immediately after the blow-molds leave this station they begin to move downwardly into the water tank.

Figure 34:
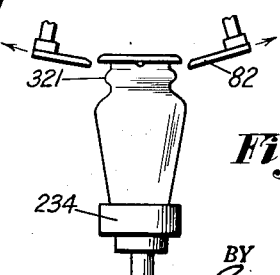
Figure 34 is a view showing the tongs being opened to release the article and allow it to be conducted away by the take-off conveyor.

The next movement of the turret will take the unit 56 with the suspended article to the take-off station 191. At this station the cylinder and piston unit 231 operates to force the shaft 68 of unit 56 downwardly and the unit 231a acts to prevent unrestrained dropping of the shaft. This lowers the article onto one of the supports 234 of conveyor 232 and causes the tongs to release the article (Figure 34). The conveyor will then carry the article to a suitable point where it is removed.

Figure 31:
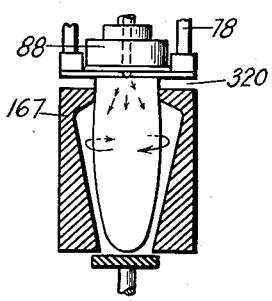
Figure 31 is a view showing the blow mold closed about the parison.
Figure 32:
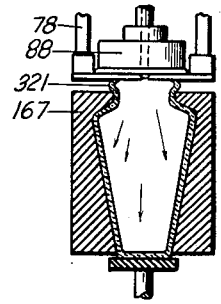
Figure 32 illustrates how the parison is expanded to the shape of a mold by air pressure supplied to the interior thereof.
Figure 33:
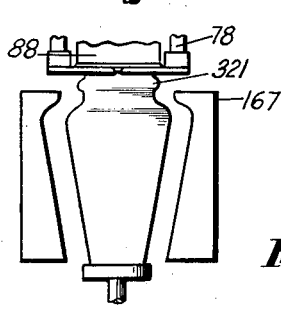
Figure 33 shows the blow mold opening to expose the finally shaped article.

It will be noted from Figures 31, 32 and 33, that the lower surfaces of the tongs do not contact with the upper end of the blow mold during the blowing operation. There is a space 320 between the tongs and the upper edge of the blow mold. This space is provided so that during the blowing operation a "blow-out" 321 of the glass over the top of the mold will occur. I make provision for this "blow-out" because after the article has been blown into contact with all surfaces of the mold, excess air pressure and volume is expanded in this blowover, operating freely against atmospheric pressure, and nothing else, thus relieving pressure inside the mold, giving a better finish on the article, and prolonging the life of the mold, as the set article is not being forced harder against the surface of the mold, than the blowing required to shape it. Consequently, the article does not become scratched by the paste, nor has it such a tendency to tear the paste out of the mold.

Sometime during the operation of the machine, it may be desirable to hold the shaft 68 of one or more of the units 56 in its uppermost position at all times. For this purpose I provide a latch associated with each unit 56. As illustrated best in Figures 1 and 15, this latch comprises a pivoted lever 301 which is pivoted to the top of housing 62 for swinging movement between a position where it is under collar 97 (Figure 15) on shaft 68 or a position where it is moved away from said collar (Figure 1). A spring-operated off-center device 302 is provided adjacent the lower end of the lever 301 for holding it in either of such positions.

Figure 35:
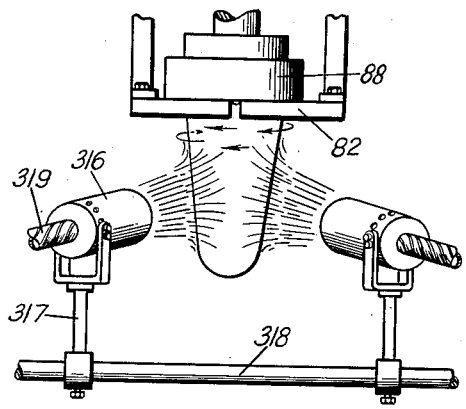
Figure 35 is a perspective view of burners for heating the sides of the blank which may be used in place of or in combination with the heating trough or chamber.
Figure 36:
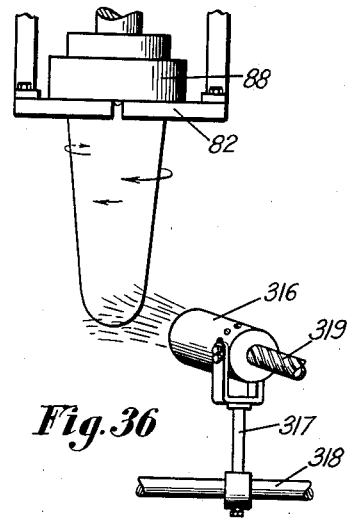
Figure 36 is a perspective view of a similar burner for heating the bottom of the article and which may be used with the burners of Figure 35 or with the heating trough or chamber.

In the preceding description, I have specified that the blanks are reheated by passing them through the heating chamber 192. However, in some instances it may be desirable to reheat the blanks with burners of the type indicated in Figures 35 and 36. In Figure 35 I show a pair of torch burners 316 adapted to project a flame on the sides of the blank. With these burners, the flame will be under high pressure and will contact directly with the blank. The flame will be a large flame which will contact with the greater portion of the side surface of the blank. The burners are so mounted that the blanks will pass by them closely adjacent thereto. They are supported on the upper ends of supports 317 which may be adjusted along a member 318 to adjust the burners relative to the suspended blanks. Each burner 316 is pivotally mounted on the upper end of the support 317 so that it may be adjustably tilted to any desired position. Each burner is supplied with an air and gas mixture by means of a flexible conduit 319. In Figure 36 I show a burner 316 like that just described.

This burner 316, however, is so adjusted that its flame will play on the bottom of the blank. This burner is adapted to burn off any marks which might be formed on the bottom of the blank during the blank-forming operation.

Figure 37:
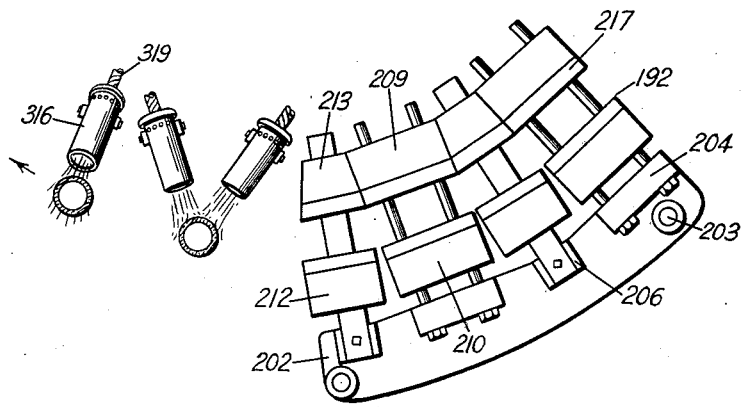
Figure 37 is a plan view showing the burners of Figures 35 and 36 being used in combination with the heating trough.

The burners just described may be used alone for reheating the blank. However, they may also be used in combination with the heating chamber 192. Thus, in Figure 37 I disclose an arrangement where the blanks pass through the heating chamber 192, then are subjected to the action of a pair of the burners 316 which play on the sides of the blanks, and are then subjected to a burner 316 which plays on the bottom of the blank. The heating chamber 192 may be used alone, the burners 316 may be used alone and any desired number thereof may be provided, and the burners 316 and the heating chamber may be used in any desired combination.

It will be apparent from the above description that I have provided a paste mold machine and process for forming glassware having many advantages. The machine will have a high capacity and can produce ware much more economically than by the hand method. It will produce ware that is uniform in quality and which is as good or better in quality than the paste mold ware now commonly produced by hand processes. The machine is very efficient and economical to operate and is comparatively simple. With this machine and process the various operations of the hand process are substantially simulated so that ware of high quality will be produced.

Various other objects and advantages will be apparent from the drawings and the following claims.

Having thus described my invention, what I claim is:

1. Apparatus for producing glassware comprising a blank-forming unit, said blank-forming unit comprising a series of blank molds, means for feeding charges of glass into the blank molds, means for preliminarily shaping the charges of glass in the blank molds, means for lifting each blank from its blank mold to expose the upper end thereof, a shaping and finishing unit, said shaping and finishing unit comprising a series of tong units having blow-heads associated therewith adapted to engage the upper ends of the blanks, means for bringing the tong units over the blank molds of the blank-forming unit, means for operating each of said tong units to cause the tongs thereof to grip the exposed portion of a blank in a cooperating blank mold, a series of blow-molds, a heating chamber through which the blanks suspended by the tongs are moved, means for rotating the tongs so that the blanks will be rotated during their passage through the heating chamber, means for supplying a puff of air through each blow-head of each tong unit so that a puff of air will be supplied to each blank during its passage through the heating chamber, means for bringing the blow-molds into cooperative relationship with the blanks after they leave the heating chamber, means for supplying blowing pressure to each blow-head of each tong unit while continuing rotation of the blank in the blow-mold, means for causing the blow-molds to move away from the blown articles when they are finished leaving them suspended from the tong units, means for releasing the articles from the tong units, and a conveyor for receiving the articles released by the tong units.

2. Apparatus for producing glassware comprising a blank-forming unit, said blank-forming unit comprising a series of blank molds, means for feeding charges of glass into the blank molds, means for preliminarily shaping the charges of glass in the blank molds, means for lifting each blank from its blank mold to expose the upper end thereof, a shaping and finishing unit, said shaping and finishing unit comprising a series of tong units having blow-heads associated therewith adapted to engage the upper ends of the blanks, means for bringing the tong units over the blank molds of the blank-forming unit, means for operating each of said tong units to cause the tongs thereof to grip the exposed portion of a blank in a cooperating blank mold, a series of blow-molds, a heating chamber through which the blanks suspended by the tongs are moved, means for rotating the tongs so that the blanks will be rotated during their passage through the heating chamber, means for supplying a puff of air through each blow-head of each tong unit so that a puff of air will be supplied to each blank during its passage through the heating chamber, means for bringing the blow-molds into cooperative relationship with the blanks after they leave the heating chamber, means for supplying blowing pressure to each blow-head of each tong unit while continuing rotation of the blank in the blow-mold, means for causing the blow-molds to move away from the blown articles when they are finished leaving them suspended from the tong units, and means for releasing the articles from the tong units.

3. Apparatus for producing glassware comprising a blank-forming unit, said blank-forming unit comprising a series of blank molds, means for feeding charges of glass into the blank molds, means for preliminarily shaping the charges of glass in the blank molds, means for exposing the upper portion of each blank in the blank mold, a shaping and finishing unit, said shaping and finishing unit comprising a series of tong units having blow-heads associated therewith, adapted to engage the upper ends of the blanks, means for bringing the tong units over the blank molds of the blank-forming unit, means for operating each of said tong units to cause the tongs thereof to grip the exposed portion of a blank in a cooperating blank mold, a series of blow molds, a heating chamber through which the blanks suspended by the tongs are moved, means for rotating the tongs so that the blanks will be rotated during their passage through the heating chamber, means for supplying a puff of air through each blow-head of each tong unit so that a puff of air will be supplied to each blank during its passage through the heating chamber, means for bringing the blow-molds into cooperative relationship with the blanks after they leave the heating chamber, means for supplying blowing pressure to each blow-head of each tong unit while continuing rotation of the blank in the blow-mold, means for causing the blow-molds to move away from the blown articles when they are finished leaving them suspended from the tong units, and means for releasing the articles from the tong units.

4. Apparatus for producing glassware comprising a blank-forming unit, said blank-forming unit comprising a series of blank molds, means for feeding charges of glass into the blank molds, means for preliminarily shaping the charges of glass in the blank molds, means for exposing the upper portion of each blank in the blank mold, a shaping and finishing unit, said shaping and finishing unit comprising a series of tong units having blow-heads associated therewith adapted to engage the upper ends of the blanks, means for bringing the tong units over the blank molds of the blank-forming unit, means for operating each of said tong units to cause the tongs thereof to grip the exposed portion of a blank in a cooperating blank mold, a series of blow-molds, a heating chamber through which the blanks suspended by the tongs are moved, means for supplying a puff of air through each blow-head of each tong unit so that a puff of air will be supplied to each blank during its passage through the heating chamber, means for bringing the blow-molds into cooperative relationship with the blanks after they leave the heating chamber, means for supplying blowing pressure to each blow-head of each tong unit to blow the blank while it is in the blow-mold, means for causing the blow-molds to move away from the blown articles when they are finished leaving them suspended from the tong units, and means for releasing the articles from the tong units.

5. Apparatus for producing glassware comprising a blank-forming unit, said blank-forming unit comprising a series of blank molds, means for feeding charges of glass into the blank molds, means for preliminarily shaping the charges of glass in the blank molds, means for exposing a portion of each blank while it is in the blank mold, a shaping and finishing unit, said shaping and finishing unit comprising a series of tong units having blow-heads associated therewith, means for bringing the tong units into cooperative relationship with the blank molds of the blank-forming unit, means for operating each of said tong units to cause the tongs thereof to grip the exposed portion of the blank in a cooperating blank mold, a series of blow-molds, a heating chamber through which the blanks suspended by the tongs are moved, means for supplying a puff of air through each blow-head of each tong unit so that a puff of air will be supplied to each blank during its passage through the heating chamber, means for bringing the blow-molds and the suspended blanks into cooperative relationship after they leave the heating chamber, means for supplying blowing pressure to each blow-head of each tong unit to blow the blank while it is in the blow-mold, means for disassociating the blow-molds and the articles after the blowing operation is finished, and means for releasing the articles from the tong units.

6. Apparatus for producing glassware comprising a blank mold, means for feeding a charge of glass into the blank mold, means for preliminarily shaping the charge of glass in the blank mold, means for exposing a portion of the blank while it is in the blank mold, a tong unit having a blow-head associated therewith, means for bringing the tong unit into cooperative relationship with the blank mold, means for operating the tong unit to cause the tongs thereof to grip the exposed portion of the blank in the blank mold, a blow-mold, a heating chamber through which the tongs-supported blank is moved, means for supplying a puff of air through the blow-head of the tong unit so that a puff of air will be supplied to the blank during its passage through the heating chamber, means for bringing the blow-mold and the tongs-supported blank into cooperative relationship after the blank leaves the heating chamber, means for supplying blowing pressure to the blow-head of the tong unit to blow the blank while it is in the blow-mold, means for disassociating the blow-mold and the article after the blowing operation is finished, and means for releasing the article from the tong unit.

7. Apparatus for producing glassware comprising a blank mold, means for feeding a charge of glass into the blank mold, means for preliminarily shaping the charge of glass in the blank mold, means for exposing a portion of the blank while it is in the blank mold, a tong unit having a blow-head associated therewith, means for bringing the tong unit into cooperative relationship with the blank mold, means for operating the tong unit to cause the tongs thereof to grip the exposed portion of the blank in the blank mold, a blow-mold, a heating chamber through which the tongs-supported blank is moved, means for bringing the blow-mold and the tongs-supported blank into cooperative relationship after the blank leaves the heating chamber, means for supplying fluid pressure to the blow-head while the blank is in the blow-mold, means for disassociating the blow-mold and the article after the blowing operation is finished, and means for releasing the article from the tong unit.

8. Apparatus for producing glassware comprising a blank-forming unit, said blank-forming unit comprising a series of blank molds mounted on a table, means for intermittently rotating said table, means for feeding charges of glass into the successive blank molds, means for preliminarily shaping the charges of glass in the successive blank molds, means for lifting the blanks from the successive blank molds to expose the upper ends thereof, a shaping and finishing unit, said shaping and finishing unit comprising a series of tong units supported on a rotatable turret, means for intermittently rotating said turret to bring the successive tong units over successive blank molds carried by said mold table, each of said tong units having a blow-head associated therewith adapted to engage the upper end of a blank, means for operating each of said tong units when it is over a blank to cause the tongs thereof to grip the exposed portion of the blank in a cooperating blank mold, a series of blow-mold units carried by said rotatable turret directly below the tong units, said blow-mold units being vertically movable on said turret, each of said blow-mold units comprising a split blow-mold having means associated therewith for controlling the opening and closing thereof, a water tank associated with the rotatable turret, means for causing the blow-mold units to move vertically into and out of the water in said tank during rotation of the turret, a heating chamber through which the suspended blanks previously removed from the blank molds by the tong units are moved, means for rotating the tong units so that the blanks will be rotated during their passage through the heating chamber, means for supplying a puff of air through each blow-head of each tong unit so that a puff of air will be supplied to each blank during its passage through the heating chamber, said means for moving the blow-molds vertically being so arranged that the blow molds will move beneath the suspended blanks after they leave the heating chamber, means for closing the blow-molds after they are in cooperative relationship with the blanks, means for supplying blowing pressure to each blow-head of each tong unit while continuing rotation of the blank in the blow-mold, means for opening the blow-molds leaving the finished articles suspended from the tong units, said means for moving the blow-molds vertically being so arranged that the blow-molds will move downwardly away from the articles, means for releasing the articles from the tong units, a conveyor for receiving the articles released by the tong units, and means for intermittently moving said conveyor.

9. Apparatus for producing glassware comprising a blank-forming unit, said blank-forming unit comprising a series of blank molds mounted on a table, means for intermittently rotating said table, means for feeding charges of glass into the successive blank molds, means for preliminarily shaping the charges of glass in the successive blank molds, means for lifting the blanks from the successive blank molds to expose the upper ends thereof, a shaping and finishing unit, said shaping and finishing unit comprising a series of tong units supported on a rotatable turret, means for intermittently rotating said turret to bring the successive tong units over successive blank molds carried by said mold table, each of said tong units having a blow-head associated therewith adapted to engage the upper end of a blank, means for operating each of said tong units when it is over a blank to cause the tongs thereof to grip the exposed portion of the blank in a cooperating blank mold, a series of blow-mold units carried by said rotatable turret directly below the tong units, said blow-mold units being vertically movable on said turret, each of said blow-mold units comprising a split blow-mold having means associated therewith for controlling the opening and closing thereof, a water tank associated with the rotatable turret, means for causing the blow-mold units to move vertically into and out of the water in said tank during rotation of the turret, a heating chamber through which the suspended blanks previously removed from the blank molds by the tong units are moved, means for rotating the tong units so that the blanks will be rotated during their passage through the heating chamber, means for supplying a puff of air through each blow-head of each tong unit so that a puff of air will be supplied to each blank during its passage through the heating chamber, said means for moving the blow-molds vertically being so arranged that the blow-molds will move beneath the suspended blanks after they leave the heating chamber, means for closing the blow-molds after they are in cooperative relationship with the blanks, means for supplying blowing pressure to each blow-head of each tong unit while continuing rotation of the blank in the blow-mold, means for opening the blow-molds leaving the finished articles suspended from the tong units, said means for moving the blow-molds vertically being so arranged that the blow-molds will move downwardly away from the articles, means for releasing the articles from the tong units, a conveyor for receiving the articles released by the tong units, and means for intermittently moving said conveyor.

10. Apparatus for producing glassware comprising a blank-forming unit, said blank-forming unit comprising a series of blank molds mounted on a table, means for rotating said table, means for feeding charges of glass into the successive blank molds, means for preliminarily shaping the charges of glass in the successive blank molds, means for lifting the blanks from the successive blank molds to expose the upper ends thereof, a shaping and finishing unit, said shaping and finishing unit comprising a series of tong units supported on a rotatable turret, means for intermittently rotating said turret to bring the successive tong units over successive blank molds carried by said mold table, each of said tong units having a blow-head associated therewith adapted to engage the upper end of a blank, means for operating each of said tong units when it is over a blank to cause the tongs thereof to grip the exposed portion of the blank in a cooperating blank mold, a series of blow-mold units carried by said rotatable turret directly below the tong units, said blow-mold units being vertically movable on said turret, each of said blow-mold units comprising a split blow-mold, a liquid tank associated with the rotatable turret, means for causing the blow-mold units to move vertically into and out of the liquid in said tank during rotation of the turret, a heating chamber through which the suspended blanks previously removed from the blank mold by the tong units are moved, means for rotating the tong units so that the blanks will be rotated during their passage through the heating chamber, means for supplying a puff of air through each blow-head of each tong unit so that a puff of air will be supplied to each blank during its passage through the heating chamber, said means for moving the blow-molds vertically being so arranged that the blow-molds will move beneath the suspended blanks after they leave the heating chamber, means for closing the blow-molds after they are in cooperative relationship with the blanks, means for supplying blowing pressure to each blow-head of each tong unit while continuing rotation of the blank in the blow-mold, means for opening the blow-molds leaving the finished articles suspended from the tong units, said means for moving the blow-molds vertically being so arranged that the blow-molds will move downwardly away from the articles, and means for releasing the articles from the tong units.

11. Apparatus for producing glassware comprising a blank forming unit, said blank forming unit comprising a series of blank molds, means for feeding charges of glass into the blank molds, means for preliminarily shaping the charges of glass in the blank molds, means for lifting each blank from its blank mold to expose the upper end thereof, a shaping and finishing unit, said shaping and finishing unit comprising a series of tong units having blow heads associated therewith adapted to engage the upper ends of the blanks, means for bringing the tong units over the blank molds of the blank forming unit, means for operating each of said tong units to cause the tongs thereof to grip the exposed portion of a blank in a cooperating blank mold, a series of blow molds, means for supplying a puff of air through each blow head of each tong unit, means for bringing the blow molds into cooperative relationship with the blanks, means for supplying blowing pressure to each blow head while the blank is in the blow mold, means for rotating each tong unit while the blank is in the blow mold, means for causing the blow molds to move away from the blown articles when they are finished leaving them suspended from the tong units, and means for releasing the articles from the tong units.

12. Apparatus for producing glassware comprising a blank forming unit, said blank forming unit comprising a series of blank molds, means for feeding charges of glass into the blank molds, means for lifting each blank from its blank mold to expose the upper end thereof, a shaping and finishing unit, said shaping and finishing unit comprising a series of tong units having blow heads associated therewith adapted to engage the upper ends of the blanks, means for bringing the tong units over the blank molds of the blank forming unit, means for operating each of said tong units to cause the tongs thereof to grip the exposed portion of the blank in a cooperating blank mold, a series of blow molds, means for bringing the blow molds into cooperative relationship with the blanks, means for supplying blowing pressure to each blow head while the blank is in the blow mold, means for rotating each tong unit while the blank is in the blow mold, means for causing the blow molds to move away from the blown articles when they are finished leaving them suspended from the tong units, and means for releasing the articles from the tong units.

13. Apparatus for producing glassware comprising a blank forming unit, said blank forming unit comprising a series of blank molds, means for feeding charges of glass into the blank molds, means for preliminarily shaping the charges of glass in the blank molds, means for lifting each blank from its blank mold to expose the upper end thereof, a shaping and finishing unit, said shaping and finishing unit comprising a series of tong units having blow heads associated therewith adapted to engage the upper ends of the blanks, means for bringing the tong units over the blank molds of the blank forming unit, means for operating each of said tong units to cause the tongs thereof to grip the exposed portion of a blank in a cooperating blank mold, a series of blow molds, means for bringing the blow molds into cooperative relationship with the blanks, means for supplying blowing pressure to each blow head while the blank is in the blow mold, means for rotating each tong unit while the blank is in the blow mold, and means for causing the blow molds to move away from the blown articles when they are finished leaving them suspended from the tong units.

14. Apparatus for producing glassware comprising a blank forming unit, said blank forming unit comprising a series of blank molds, means for feeding charges of glass into the blank molds, means for preliminarily shaping the charges of glass in the blank molds, means for lifting each blank from its blank mold to expose the upper end thereof, a shaping and finishing unit, said shaping and finishing unit comprising a series of tong units having blow heads associated therewith adapted to engage the upper ends of the blanks, means for bringing the tong units over the blank molds of the blank forming unit, means for operating each of said tong units to cause the tongs thereof to grip the exposed portion of a blank in a cooperating blank mold, a series of blow molds, means for bringing the blow molds into cooperative relationship with the blanks, means for supplying blowing pressure to each blow head while the blank is in the blow mold, and means for causing the blow molds to move away from the blown articles when they are finished leaving them suspended from the tong units.

15. In apparatus for forming glassware, a rotatable turret, a plurality of split blow molds carried by said turret, means for closing said blow molds, said means comprising a pivoted lever having a locking portion adapted to engage cooperating portions on the blow mold, means for operating said pivoted lever to cause it to lock the blow mold, said means comprising a track with which a member carried by said lever will be engaged during rotation of said turret, said track terminating at a predetermined point to permit movement of said locking lever into unlocking position, and means at said predetermined point associated with said track for insuring that the locking lever will be moved to unlocking position.

16. The method of forming glassware which comprises forming a blank with a flange on the upper edge thereof in a suitable blank mold, gripping the upper end of the hot blank by means of tongs which form lugs on the flange of the hot blank which serve to prevent relative rotation of the blank and the tongs, and then placing the blank in a blow mold and subjecting it to blowing pressure while simultaneously rotating it in the blow mold.

17. The method of forming glassware which comprises forming a blank in a blank mold, lifting the blank in the blank mold to expose the upper end thereof, gripping the upper end of the blank with tongs and removing it from the blank mold, passing the blank while suspended from the tongs through a heating chamber and preliminarily blowing it, moving a blow mold around the blank while it is supported from the tongs and subjecting the blank while it is in the blow mold to blowing pressure and simultaneously rotating it in the blow mold.

18. The method of forming glassware which comprises forming a blank in a blank mold, exposing the upper portion of the blank, gripping the upper portion of the blank with tongs and removing it from the blank mold, passing the blank while suspended from the tongs through a heating chamber, moving a blow mold around the blank while it is supported from the tongs and subjecting the blank while it is in the blow mold to blowing pressure and simultaneously rotating it in the blow mold.

19. The method of forming glassware which comprises forming a blank in a blank mold, exposing the upper portion of the blank, gripping the upper portion of the blank with tongs and removing it from the blank mold, moving a blow mold around the blank while it is supported from the tongs and subjecting the blank while it is in the blow mold to blowing pressure and simultaneously rotating it in the blow mold.

20. The method of forming glassware which comprises forming a blank in a blank mold, lifting the blank in the blank mold to expose the upper end thereof, moving a tong unit over the blank mold and causing the tongs thereof to engage the upper end of the blank to remove it from the blank mold, moving a blow mold around the blank while it is suspended from the tong unit, blowing the blank while it is in the blow mold and simultaneously rotating it in the blow mold.

21. The method of forming glassware which comprises successively forming a series of blanks in a series of blank molds, successively lifting the blanks from the blank molds to expose the upper ends thereof, moving successive tong units over the successive blank molds and causing the tongs thereof to engage the upper ends of the successive blanks to remove them from the blank molds, moving successive blow molds around the successive blanks while they are suspended from the tong units, blowing the blanks while they are in the blow molds and simultaneously rotating them.

in the blow molds, and then removing the successive blanks from the blow molds.

22. The method of forming glassware which comprises successively forming a series of blanks in a series of blank molds, successively exposing the upper ends of the blanks in the blank molds, moving successive tong units over the successive blank molds and causing the tongs thereof to engage the upper ends of the successive blanks to remove them from the blank molds, moving the successive blanks while suspended from the tong units through a heating chamber, moving successive blow molds around the successive blanks while they are suspended from the tong units, blowing the blanks while they are in the blow molds and simultaneously rotating them in the blow molds, and then removing the successive blanks from the blow molds.

23. The method of forming glassware which comprises forming a blank in a blank mold, exposing the upper portion of the blank, gripping the upper portion of the blank and sealing it by means of a tongs and blow head unit and removing it from the blank mold, moving a blow mold around the blank while it is supported from the tongs and blow head unit and subjecting the blank while it is in the blow mold to blowing pressure, and maintaining the lower surface of the combined tongs and blow head unit spaced from the upper edge of the blow mold during the blowing operation to permit a portion of the glass to blow over the upper edge of the blow mold during the blowing operation.

24. The method of forming glassware which comprises forming a blank in a blank mold, removing the blank from the blank mold by means of a combined tongs and blow head unit, moving a blow mold around the blank while it is supported from the tongs and blow head unit and subjecting the blank while it is in the blow mold to blowing pressure, and maintaining the lower surface of the combined tongs and blow head unit spaced from the upper edge of the blow mold during the blowing operation to permit a portion of the glass to blow over the upper edge of the blow mold during the blowing operation.

25. Apparatus for forming glassware comprising means including a blank mold for forming a blank, means for exposing the upper portion of the blank, combined tongs and blow head for gripping the upper portion of the blank and sealing it and for removing it from the blank mold, a blow mold, means for moving the blow mold into cooperative relationship with the blank while it is supported from the combined tongs and blow head, and means for supplying air pressure to the blow head to blow the blank in the blow mold, the combined tongs and blow head being out of contact with the upper edge of the blow mold during the blowing operation to permit a portion of the glass to blow over the upper edge of the blow mold during the blowing operation.

26. In apparatus for forming glassware a tong unit having tongs adapted to grip and support an article, said tong unit comprising movable gripping members, means for actuating said gripping members, said means comprising an axially movable shaft, means for moving said shaft to cause it to operate the gripping members so that they will grip the article, a latch member for locking the shaft in position, a spring for actuating said latch to cause it to lock the shaft in position, and cam means for engaging said latch to ensure that it will lock the shaft in position.

27. Apparatus for producing glassware comprising a rotatable support carrying a series of article-supporting members, said article-supporting members being vertically movable on said support, means for rotating said support, means for raising each of said article-supporting members at a predetermined time, means for locking each of said article-supporting members in its uppermost position, and safety means for rendering said means for rotating said support inoperative if each of said article-supporting members is not locked in its uppermost position.

28. Apparatus for producing glassware comprising a rotatable support carrying a series of tong members for gripping the articles, means for rotating said support, means for raising each of said tong units at a predetermined time, means for locking each of said tong units in its uppermost position, and safety means for rendering said means for rotating said support inoperative if each of said tong units is not moved to and locked in its uppermost position.

29. Apparatus for forming glassware comprising a blank mold table, a turret carrying a plurality of tong units, means for rotating said blank mold table, means for rotating said turret, said tong units being vertically movable on said turret, means for moving each of said tong units to its uppermost position and locking it in such position, and a safety means for rendering said rotating means for said blank table and turret inoperative if each of said tong units is not moved to and is not locked in its uppermost position.

30. Apparatus for forming glassware comprising a blank mold table, a turret carrying a plurality of tong units, means for rotating said blank mold table, means for rotating said turret, means for driving both of said last-named means including a clutch, said tong units being vertically movable on said turret, means for moving each of said tong units to its uppermost position and locking it in such position, and a safety means for rendering said rotating means for said blank table and turret inoperative if each of said tong units is not moved to and is not locked in its uppermost position, said means comprising fluid-operated means for disengaging said clutch.

31. Apparatus for producing glassware comprising a blank-forming unit, said blank-forming unit comprising a series of blank molds, means for feeding charges of glass into the blank molds, means for preliminarily shaping the charges of glass in the blank molds, means for lifting each blank from its blank mold to expose the upper end thereof, a shaping and finishing unit, said shaping and finishing unit comprising a series of tong units having blow heads associated therewith adapted to engage the upper ends of the blanks, means for bringing the tong units over the blank molds of the blank-forming unit, means for operating each of said tong units to cause the tongs thereof to grip the exposed portion of a blank in a cooperating blank mold, a series of blow molds, means for heating the blank while suspended by the tongs, means for rotating the tongs so that the blanks will be rotated during the time they are being heated by said heating means, means for supplying a puff of air through each blow head of each tong unit so that a puff of air will be supplied to each blank after it is subjected to heat by said heating means, means for bringing the blow molds into cooperative relationship with the blanks after they leave the heating means, means for supplying blowing pressure to each blow head of each tong unit while continuing rotation of the blank in the blow mold, means for causing the blow molds to move away from the blown articles when they are finished leaving them suspended from the tong units, and means for releasing the articles from the tong units.

32. Apparatus for producing glassware comprising a blank-forming unit, said blank-forming unit comprising a series of blank molds, means for feeding charges of glass into the blank molds, means for preliminarily shaping the charges of glass in the blank molds, means for exposing the upper portion of each blank in the blank mold, a shaping and finishing unit, said shaping and finishing unit comprising a series of tong units having blow heads associated therewith adapted to engage the upper ends of the blanks, means for bringing the tong units over the blank molds of the blank-forming unit, means for operating each of said tong units to cause the tongs thereof to grip the exposed portion of a blank in a cooperating blank mold, a series of blow molds, means for heating the blank while suspended by the tongs, means for rotating the tongs so that the blanks will be rotated during the time they are being heated by said heating means, means for supplying a puff of air through each blow head of each tong unit so that a puff of air will be supplied to each blank after it is subjected to heat by said heating means, means for bringing the blow molds into cooperative relationsip with the blanks after they leave the heating means, means for supplying blowing pressure to each blow head of each tong unit while continuing rotation of the blank in the blow mold, means for causing the blow molds to move away from the blown articles when they are finished leaving them suspended from the tong units, and means for releasing the articles from the tong units.

33. Apparatus for producing glassware comprising a blank-forming unit, said blank-forming unit comprising a series of blank molds, means for feeding charges of glass into the blank molds, means for preliminarily shaping the charges of glass in the blank molds, means for exposing the upper portion of each blank in the blank mold, a shaping and finishing unit, said shaping and finishing unit comprising a series of tong units having blow heads associated therewith adapted to engage the upper ends of the blanks, means for bringing the tong units over the blank molds of the blank-forming unit, means for operating each of said tong units to cause the tongs thereof to grip the exposed portion of a blank in a cooperating blank mold, a series of blow molds, means for heating the blanks while suspended by the tongs, means for supplying a puff of air through each blow head of each tong unit so that a puff of air will be supplied to each blank after it is subjected to heat by said heating means, means for bringing the blow molds into cooperative relationship with the blanks after they leave the heating means, means for supplying blowing pressure to each blow head of each tong unit to blow the blank while it is in the blow mold, means for causing the blow molds to move away from the blown articles when they are finished leaving them suspended from the tong units, and means for releasing the articles from the tong units.

34. Apparatus for producing glassware comprising a blank-forming unit, said blank-forming unit comprising a series of blank molds, means for feeding charges of glass into the blank molds, means for preliminarily shaping the charges of glass in the blank molds, means for exposing a portion of each blank while it is in the blank mold, a shaping and finishing unit, said shaping and finishing unit comprising a series of tong units having blow heads associated therewith, means for bringing the tong units into cooperative relationship with the blank molds of the blank-forming unit, means for operating each of said tong units to cause the tongs thereof to grip the exposed portion of the blank in a cooperating blank mold, a series of blow molds, means for heating the blanks while supported by the tongs, means for supplying a puff of air through each blow head of each tong unit so that a puff of air will be supplied to each blank after it is subjected to heat by said heating means, means for bringing the blow molds and the tong-supported blanks into cooperative relationship after they leave the heating means, means for supplying blowing pressure to each blow head of each tong unit to blow the blank while it is in the blow mold, means for disassociating the blow molds and the articles after the blowing operation is finished, and means for releasing the articles from the tong units.

35. Apparatus for producing glassware comprising a blank mold, means for feeding a charge of glass into the blank mold, means for preliminarily shaping the charge of glass in the blank mold, means for exposing a portion of the blank while it is in the blank mold, a tong unit having a blow head associated therewith, means for bringing the tong unit into cooperative relationship with the blank mold, means for operating the tong unit to cause the tongs thereof to grip the exposed portion of the blank in the blank mold, a blow mold, means for heating the blanks while supported by the tongs, means for supplying a puff of air through the blow head of the tong unit so that a puff of air will be supplied to the blank after it is subjected to heat by said heating means, means for bringing the blow mold and the tong-supported blank into cooperative relationship after the blank leaves the heating means, means for supplying blowing pressure to the blow head of the tong unit to blow the blank while it is in the blow mold, means for disassociating the blow mold and the article after the blowing operation is finished, and means for releasing the article from the tong unit.

36. Apparatus for producing glassware comprising a blank mold, means for feeding a charge of glass into the blank mold, means for preliminarily shaping the charge of glass in the blank mold, means for exposing a portion of the blank while it is in the blank mold, a tong unit having a blow head associated therewith, means for bringing the tong unit into cooperative relationship with the blank mold, means for operating the tong unit to cause the tongs thereof to grip the exposed portion of a blank in the blank mold, a blow mold, a heating means to which the tong-supported blank is subjected, means for bringing the blow mold and the tong-supported blank into cooperative relationship after the blank leaves the heating means, means for supplying fluid pressure to the blow head while the blank is in the blow mold, means for disassociating the blow mold and the article after the blowing operation is finished, and means for releasing the article from the tong unit.

37. Apparatus for producing glassware comprising a blank-forming unit, said blank-forming unit comprising a series of blank molds mounted on a table, means for intermittently rotating said table, means for feeding charges of glass into the successive blank molds, means for preliminarily shaping the charges of glass in the successive blank molds, means for lifting the blanks from the successive blank molds to expose the upper ends thereof, a shaping and finishing unit, said shaping and finishing unit comprising a series of tong units supported on a rotatable turret, means for intermittently rotating said turret to bring the successive tong units over successive blank molds carried by said mold table, each of said tong units having a blow head associated therewith adapted to engage the upper end of a blank, means for operating each of said tong units when it is over a blank to cause the tongs thereof to grip the exposed portion of the blank in a cooperating blank mold, a series of blow mold units carried by said rotatable turret directly below the tong units, said blow mold units being vertically movable on said turret, each of said blow mold units comprising a split blow mold having means associated therewith for controlling the opening and closing thereof, a water tank associated with the rotatable turret, means for causing the blow mold units to move vertically into and out of the water in said tank during rotation of the turret, a heating means to which the suspended blanks previously removed from the blank molds by the tong units are moved, means for rotating the tong units so that the blanks will be rotated during the time they are subjected to the heating means, means for supplying a puff of air through each blow head of each tong unit so that a puff of air will be supplied to each blank after it is subjected to heat by the heating means, said means for moving the blow molds vertically being so arranged that the blow molds will move downwardly away from the articles, means for releasing the articles from the tong units, a conveyor for receiving the articles released by the tong units, and means for intermittently moving said conveyor.

38. Apparatus for producing glassware comprising a blank-forming unit, said blank-forming unit comprising a series of blank molds mounted on a table, means for intermittently rotating said table, means for feeding charges of glass into the successive blank molds, means for preliminarily shaping the charges of glass in the successive blank molds, means for lifting the blanks from the successive blank molds to expose the upper end thereof, a shaping and finishing unit, said shaping and finishing unit comprising a series of tong units supported on a rotatable turret, means for intermittently rotating said turret to bring the successive tong units over successive blank molds carried by said mold table, each of said tong units having a blow head associated therewith adapted to engage the upper end of a blank, means for operating each of said tong units when it is over a blank to cause the tongs thereof to grip the exposed portion of the blank in a cooperating blank mold, a series of blow mold units carried by said rotatable turret directly below the tong units, said blow mold units being vertically movable on said turret, each of said blow mold units comprising a split blow mold having means associated therewith for controlling the opening and closing thereof, a water tank associated with the rotatable turret, means for causing the blow mold units to move vertically into and out of the water in said tank during rotation of the turret, a heating means to which the suspended blanks previously removed from the blank molds by the tong units are moved, means for rotating the tong units so that the blanks will be rotated during the time they are being heated by said heating means, means for supplying a puff of air through each blow head of each tong unit so that a puff of air will be supplied to each blank after it is subjected to heat by said heating means, said means for moving the blow molds vertically being so arranged that the blow molds will move beneath the suspended blanks after they leave the heating means, means for closing the blow molds after they are in cooperative relationship with the blanks, means for supplying blowing pressure to each blow head of each tong unit while continuing rotation of the blank in the blow mold, means for opening the blow molds leaving the finished articles suspended from the tong units, said means for moving the blow molds vertically being so arranged that the blow molds will move downwardly away from the articles, means for releasing the articles from the tong units, a conveyor for receiving the articles released by the tong units and means for intermittently moving said conveyor.

39. Apparatus for producing glassware comprising a blank-forming unit, said blank-forming unit comprising a series of blank molds mounted on a table, means for rotating said table, means for feeding charges of glass into the successive blank molds, means for preliminarily shaping the charges of glass in the successive blank molds, means for lifting the blanks from the successive blank molds to expose the upper ends thereof, a shaping and finishing unit, said shaping and finishing unit comprising a series of tong units supported on a rotatable turret, means for intermittently rotating said turret to bring the successive tong units over successive blank molds carried by said mold table, each of said tong units having a blow head associated therewith adapted to engage the upper end of a blank, means for operating each of said tong units when it is over a blank to cause the tongs thereof to grip the exposed portion of the blank in the cooperating blank mold, a series of blow mold units carried by said rotatable turret directly below the tong units, said blow mold units being vertically movable on said turret, each of said blow mold units comprising a split blow mold, a liquid tank associated with the rotatable turret, means for causing the blow mold units to move vertically into and out of the liquid in said tank during rotation of the turret, a heating means to which a suspended blank previously removed from the blank mold by the tong units is moved, means for rotating the tong units so that the blanks will be rotated during the time they are being heated by said heating means, means for supplying a puff of air through each blow head of each tong unit so that a puff of air will be supplied to each blank after it is subjected to heat by said heating means, said means for moving the blow molds vertically being so arranged that the blow molds will move beneath the suspended blank after they leave the heating means, means for closing the blow molds after they are in cooperative relationship with the blanks, means for supplying blowing pressure to each blow head of each tong unit while continuing rotation of the blank in the blow mold, means for opening the blow molds leaving the finished articles suspended from the tong units, said means for moving the blow molds vertically being so arranged that the blow molds are moved downwardly away from the articles, and means for releasing the articles from the tong units.

40. The method of forming glassware which comprises forming a blank in a blank mold, lifting the blank in the blank mold to expose the upper end thereof, gripping the upper end of the blank with tongs and removing it from the blank mold, heating the blank while suspended from the tongs and preliminarily blowing it, moving a blow mold around the blank while it is supported from the tongs and subjecting the blank while it is in the blow mold to blowing pressure and simultaneously rotating it in the blow mold.

41. The method of forming glassware which comprises forming a blank in a blank mold, exposing the upper portion of the blank, gripping the upper portion of the blank with tongs and removing it from the blank mold, heating the blank while suspended from the tongs, moving a blow mold around the blank while it is supported from the tongs and subjecting the blank while it is in the blow mold to blowing pressure and simultaneously rotating it in the blow mold.

42. The method of forming glassware which comprises successively forming a series of blanks in a series of blow molds, successively exposing the upper ends of the blanks in the blank molds, moving successive tong units over the successive blank molds and causing the tongs thereof to engage the upper ends of the successive blanks to remove them from the blank molds, heating the successive blanks while suspended from the tong units, moving successive blow molds around the successive blanks while they are suspended from the tong units, blowing the blanks while they are in the blow molds and simultaneously rotating them in the blow molds, and then removing the successive blanks from the blow molds.

43. Apparatus for producing glassware comprising a blank-forming unit, said blank-forming unit comprising a series of blank molds, means for feeding charges of glass into the blank mold, means for preliminarily shaping the charges of glass in the blank molds, means for lifting each blank from its blank mold to expose the upper end thereof, a shaping and finishing unit, said shaping and finishing unit comprising a series of tong units having blow heads associated therewith adapted to engage the upper ends of the blanks, means for bringing the tong units over the blank molds of the blank-forming unit, means for operating each of said tong units to cause the tongs thereof to grip the exposed portion of a blank in a cooperating blank mold, a series of blow molds, means for rotating the tongs, means for supplying a puff of air to each blow head of each tong unit, means for bringing the blow molds into cooperative relationship with the blanks, means for supplying blowing pressure to each blow head of each tong unit while continuing rotation of the blank in the blow mold, means for causing the blow mold to move away from the blown articles when they are finished, leaving them suspended from the tong units, means for releasing the articles from the tong units, and a conveyor for receiving the articles released by the tong units.

44. Apparatus for producing glassware comprising a blank-forming unit, said blank-forming unit comprising a series of blank molds, means for feeding charges of glass into the blank molds, means for preliminarily shaping the charges of glass in the blank molds, means for exposing the upper portion of each blank in the blank molds, a shaping and finishing unit, said shaping and finishing unit comprising a series of tong units having blow heads associated therewith adapted to engage the upper ends of the blanks, means for bringing the tong units over the blank molds of the blank-forming unit, means for operating each of said tong units to cause the tongs thereof to grip the exposed portion of a blank in a cooperating blank mold, a series of blow molds, means for supplying a puff of air through each blow head of each tong unit, means for bringing the blow molds into cooperative relationship with the blanks, means for supplying blowing pressure to each blow head of each tong unit to blow the blank while it is in the blow mold, means for causing the blow molds to move away from the blown articles when they are finished leaving them suspended from the tong units, and means for releasing the articles from the tong units.

45. Apparatus for producing glassware comprising a blank-forming unit, said blank-forming unit comprising a series of blank molds, means for feeding charges of glass into the blank molds, means for preliminarily shaping the charges of glass in the blank molds, means for exposing a portion of each blank while it is in the blank mold, a shaping and finishing unit, said shaping and finishing unit comprising a series of tong units having blow heads associated therewith, means for bringing the tong units into cooperative relationship with the blank molds of the blank-forming unit, means for operating each of said tong units to cause the tongs thereof to grip the exposed portion of the blank in a cooperating blank mold, a series of blow molds, means for supplying a puff of air through each blow head of each tong unit so that a puff of air will be supplied to each blank, means for bringing the blow molds and the suspended blanks into cooperative relationship, means for supplying blowing pressure to each blow head of each tong unit to blow the blank while it is in the blow mold, means for disassociating the blow molds and the articles after the blowing operation is finished, and means for releasing the articles from the tong units.

46. Apparatus for producing glassware comprising a blank mold, means for feeding a charge of glass into the blank mold, means for preliminarily shaping the charge of glass in the blank mold, means for exposing a portion of the blank while it is in the blank mold, a tong unit having a blow ahead associated therewith, means for bringing the tong unit into cooperative relationship with the blank mold, means for operating the tong unit to cause the tongs thereof to grip the exposed portion of the blank in the blank mold, a blow mold, means for supplying a puff of air through the blow head of the tong unit so that a puff of air will be supplied to the blank, means for bringing the blow mold and the tongs-supported blank into cooperative relationship, means for supplying blowing pressure to the blow head of the tong unit to blow the blank while it is in the blow mold, means for disassociating the blow mold and the article after the blowing operation is finished, and means for releasing the article from the tong unit.

47. Apparatus for producing glassware comprising a blank mold, means for feeding a charge of glass into the blank mold, means for preliminarily shaping the charge of glass in the blank mold, means for exposing a portion of the blank while it is in the blank mold, a tong unit having a blow head associated therewith, means for bringing the tong unit into cooperative relationship with the blank mold, means for operating the tong unit to cause the tongs thereof to grip the exposed portion of the blank in the blank mold, a blow mold, means for bringing the blow mold and the tongs-supported blank into cooperative relationship, means for supplying fluid pressure to the blow head while the blank is in the blow mold, means for disassociating the blow mold and the article after the blowing operation is finished, and means for releasing the article from the tong unit.

48. Apparatus for producing glassware comprising a blank-forming unit, said blank-forming unit comprising a series of blank molds mounted on a table, means for intermittently rotating said table, means for feeding charges of glass into the successive blank molds, means for preliminarily shaping the charges of glass in the successive blank molds, means for lifting the blanks from the successive blank molds to expose the upper ends thereof, a shaping and finishing unit, said shaping and finishing unit comprising a series of tong units supported on a rotatable turret, means for intermittently rotating said turret to bring the successive tong units over successive blank molds carried by said mold table, each of said tong units having a blow head associated therewith adapted to engage the upper end of a blank, means for operating each of said tong units when it is over a blank to cause the tongs thereof to grip the exposed portion of a blank in a cooperating blank mold, a series of blow mold units carried by said rotatable turret directly below the tong units, said blow mold units being vertically movable on said turret, each of said blow mold units comprising a split blow mold having means associated therewith for controlling the opening and closing thereof, a water tank associated with the rotatable turret, means for causing the blow mold units to move vertically into and out of the water in said tank during rotation of the turret, means for rotating the tong units, means for supplying a puff of air through each blow head of each tong unit so that a puff of air will be supplied to each blank, said means for moving the blow molds vertically being so arranged that the blow molds will move beneath the suspended blanks, means for closing the blow molds after they are in cooperative relationship with the blanks, means for supplying blowing pressure to each blow head of each tong unit while continuing rotation of the blank in the blow mold, means for opening the blow molds leaving the finished articles suspended from the tong units, said means for moving the blow molds vertically being so arranged that the blow molds will move downwardly away from the articles, means for releasing the articles from the tong units, a conveyor for receiving the articles released by the tong units, and means for intermittently moving said conveyor.

49. Apparatus for producing glassware comprising a blank-forming unit, said blank-forming unit comprising a series of blank molds mounted on a table, means for intermitently rotating said table, means for feeding charges of glass into the successive blank molds, means for preliminarily shaping the charges of glass in the successive blank molds, means for lifting the blanks from the successive blank molds to expose the upper ends thereof, a shaping and finishing unit, said shaping and finishing unit comprising a series of tong units supported on a rotatable turret, means for intermittently rotating said turret to bring the successive tong units over successive blank molds carried by said mold table, each of said tong units having a blow head associated therewith adapted to engage the upper end of a blank, means for operating each of said tong units when it is over a blank to cause the tongs thereof to grip the exposed portion of a blank in a cooperating blank mold, a series of blow mold units carried by said rotatable turret directly below the tong units, said blow mold unit being vertically movable on said turret, each of said blow mold units comprising a split blow mold having means associated therewith for controlling the opening and closing thereof, a water tank associated with the rotatable turret, means for causing the blow mold units to move vertically into and out of the water in said tank during rotation of the turret, means for rotating the tong units, means for supplying a puff of air through each blow head of each tong unit so that a puff of air will be supplied to each blank, said means for moving the blow molds vertically being so arranged that the blow molds will move beneath the suspended blanks, means for closing the blow molds after they are in cooperative relationship with the blanks, means for supplying blowing pressure to each blow head of each tong unit while continuing rotation of the blank in the blow mold, means for opening the blow molds leaving the finished articles suspended from the tong units, said means for moving the blow molds vertically being so arranged that the blow molds will move downwardly away from the articles, means for releasing the articles from the tong units, a conveyor for receiving the articles released by the tong units, and means for intermitently moving said conveyor.

50. Apparatus for producing glassware comprising a blank-forming unit, said blank-forming unit comprising a series of blank molds mounted on a table, means for intermittently rotating said table, means for feeding charges of glass into the successive blank molds, means for preliminarily shaping the charges of glass in the successive blank molds, means for lifting the blanks from the successive blank molds to expose the upper end thereof, a shaping and finishing unit, said shaping and finishing unit comprising a series of tong units supported on a rotatable turret, means for intermittently rotating said turret to bring the successive tong units over successive blank molds carried by said mold table, each of said tong units having a blow head associated therewith adapted to engage the upper end of a blank, means for operating each of said tong units when it is over a blank to cause the tongs thereof to grip the exposed portion of a blank in a cooperating blank mold, a series of blow mold units carried by said rotatable turret directly below the tong units, said blow mold units being vertically movable on said turret, each of said blow mold units comprising a split blow mold, a liquid tank associated with the rotatable turret, means for causing the blow mold unit to move vertically into and out of the liquid in said tank during rotation of the turret, means for rotating the tong units, means for supplying a puff of air through each blow head of each tong unit so that a puff of air will be supplied to each blank, said means for moving the blow molds vertically being so arranged that the blow molds will move beneath the suspended blanks, means for closing the blow molds after they are in cooperative relationship with the blanks, means for supplying blowing pressure to each blow head of each tong unit while continuing rotation of the blank in the blow mold, means for opening the blow molds leaving the finished articles suspended from the tong units, said means for moving the blow molds vertically being so arranged that the blow molds will move downwardly away from the articles, and means for releasing the articles from the tong units.

ROBERT J. BEATTY.